(12) United States Patent
Leonard, II et al.

(10) Patent No.: US 11,307,876 B1
(45) Date of Patent: Apr. 19, 2022

(54) AUTOMATED REMEDIAL ACTION TO EXPOSE A MISSING TARGET AND/OR ANCHOR(S) FOR USER INTERFACE AUTOMATION

(71) Applicant: UiPath, Inc., New York, NY (US)

(72) Inventors: Michael Aristo Leonard, II, Alexandria, VA (US); Cosmin Voicu, Bucharest (RO)

(73) Assignee: UiPath, Inc., New York, NY (US)

( * ) Notice: Subject to any disclaimer, the term of this patent is extended or adjusted under 35 U.S.C. 154(b) by 0 days.

(21) Appl. No.: 17/101,036

(22) Filed: Nov. 23, 2020

Related U.S. Application Data

(63) Continuation of application No. 17/100,146, filed on Nov. 20, 2020, now Pat. No. 11,200,073.

(51) Int. Cl.
  *G06F 9/451* (2018.01)
  *G06F 3/04812* (2022.01)
  (Continued)

(52) U.S. Cl.
  CPC ............ *G06F 9/451* (2018.02); *G06F 3/0482* (2013.01); *G06F 3/04812* (2013.01); *G06F 3/04817* (2013.01); *G06F 3/04845* (2013.01)

(58) Field of Classification Search
  CPC ........................... G06F 9/451; G06F 3/048–05
  See application file for complete search history.

(56) References Cited

U.S. PATENT DOCUMENTS 6,025,841 A * 2/2000 Finkelstein .............. G09G 5/14
                                                  715/803
6,101,510 A * 8/2000 Stone ...................... H04L 67/02
                                                  715/234

(Continued)

FOREIGN PATENT DOCUMENTS

CN          111158828 A    5/2020
KR      1020190017029 A    2/2019

(Continued)

OTHER PUBLICATIONS

Mong-Shune Chung, "Notice of Allowance", dated Nov. 1, 2021, U.S. Appl. No. 17/100,146.

(Continued)

*Primary Examiner* — Daniel Rodriguez
(74) *Attorney, Agent, or Firm* — LeonardPatel PC; Michael A. Leonard, II; Sheetal S. Patel

(57) ABSTRACT

Automatic anchor determination for target graphical element identification in user interface (UI) automation is disclosed. A context-based mechanism assists in discriminating between duplicate target UI element candidates. More specifically, additional anchors may be determined and automatically added for a target UI element that provide context and are visible in an area surrounding the target. During design time, a target UI element may be indicated by a user of a designer application and a corresponding anchor may be determined. When a pair of UI elements is found having the same or similar characteristics and/or relationships to the target-anchor pair, an additional anchor is automatically identified without requesting user input. The additional anchor may be selected from the UI elements within a radius of the target UI element.

20 Claims, 25 Drawing Sheets

(51) Int. Cl.
*G06F 3/04845* (2022.01)
*G06F 3/0482* (2013.01)
*G06F 3/04817* (2022.01)

(56) References Cited

U.S. PATENT DOCUMENTS

| | | | | |
|---|---|---|---|---|
| 7,620,899 | B2* | 11/2009 | Abdo | G06F 9/451 |
| | | | | 715/740 |
| 8,117,554 | B1* | 2/2012 | Grechishkin | G06F 9/451 |
| | | | | 715/764 |
| 9,298,474 | B2* | 3/2016 | Bauchot | G06F 9/451 |
| 9,424,167 | B2 | 8/2016 | Lee et al. | |
| 9,720,707 | B1 | 8/2017 | Shook et al. | |
| 10,620,975 | B1* | 4/2020 | Zohar | G06F 3/0482 |
| 10,705,948 | B2* | 7/2020 | Ramasamy | G06F 11/3688 |
| 10,769,427 | B1* | 9/2020 | Gajera | G06V 10/30 |
| 10,802,889 | B1* | 10/2020 | Ganesan | G06F 9/5005 |
| 10,911,546 | B1* | 2/2021 | Goswami | H04L 67/141 |
| 10,970,090 | B2 | 4/2021 | Hall et al. | |
| 2006/0047748 | A1* | 3/2006 | Kelso | H04L 67/306 |
| | | | | 709/204 |
| 2012/0124495 | A1* | 5/2012 | Amichai | G06F 9/44 |
| | | | | 715/764 |
| 2012/0266079 | A1* | 10/2012 | Lee | G06F 16/27 |
| | | | | 715/744 |
| 2014/0313104 | A1* | 10/2014 | Ono | G09G 5/14 |
| | | | | 345/2.3 |
| 2017/0052824 | A1* | 2/2017 | Sharma | G06F 9/453 |
| 2017/0228119 | A1* | 8/2017 | Hosbettu | G06Q 10/00 |
| 2017/0295243 | A1* | 10/2017 | Kim | H04L 67/40 |
| 2018/0007400 | A1* | 1/2018 | Chen | H04N 19/42 |
| 2018/0012386 | A1 | 1/2018 | Kemelmaher | |
| 2018/0210725 | A1* | 7/2018 | Vaindiner | G06F 8/38 |
| 2019/0129824 | A1* | 5/2019 | Radhakrishnan | G06F 11/3664 |
| 2019/0130094 | A1* | 5/2019 | Votaw | H04L 63/0861 |
| 2019/0141596 | A1* | 5/2019 | Gay | G05B 19/4185 |
| 2019/0205363 | A1 | 7/2019 | Zukerman et al. | |
| 2019/0265990 | A1 | 8/2019 | Hall et al. | |
| 2019/0310868 | A1* | 10/2019 | Vaindiner | G06F 8/38 |
| 2020/0242017 | A1* | 7/2020 | Konyshev | G06F 9/453 |
| 2020/0249964 | A1* | 8/2020 | Fernandes | G06F 11/302 |
| 2020/0293347 | A1* | 9/2020 | Buckley | G06F 9/455 |
| 2020/0401431 | A1* | 12/2020 | Rashid | G06F 9/451 |
| 2021/0216336 | A1* | 7/2021 | Dubba | G06F 3/0481 |
| 2021/0286849 | A1* | 9/2021 | Grant | G06F 16/906 |
| 2021/0314339 | A1* | 10/2021 | Tsarfati | G06F 21/577 |
| 2021/0333983 | A1* | 10/2021 | Singh | G06V 10/225 |
| 2021/0334817 | A1* | 10/2021 | Boston | H04L 63/0442 |

FOREIGN PATENT DOCUMENTS

| | | |
|---|---|---|
| KR | 1020200037816 A | 4/2020 |
| KR | 1020210010388 A | 1/2021 |

OTHER PUBLICATIONS

Notice of Allowance issued in Korean Application No. 10-2021-7043139 dated Jan. 11, 2022.
International Search Report & Written Opinion, dated Feb. 14, 2022, PCT Application No. PCT/US21/56919.
International Search Report & Written Opinion, dated Feb. 15, 2022, PCT Patent Application No. PCT/US21/56920.

* cited by examiner

Shopping Cart

Shipping Information:

First Name:
Last Name:
Address:
City:
State:
Postal Code:
Country:

1012

Submit     Cancel

US 11,307,876 B1

AUTOMATED REMEDIAL ACTION TO EXPOSE A MISSING TARGET AND/OR ANCHOR(S) FOR USER INTERFACE AUTOMATION

CROSS REFERENCE TO RELATED APPLICATION

This application is a continuation of, and claims the benefit of, U.S. patent application Ser. No. 17/100,146 filed Nov. 20, 2020. The subject matter of this earlier filed application is hereby incorporated by reference in its entirety.

FIELD

The present invention generally relates to user interface (UI) automation, and more specifically, to automatic anchor determination for target graphical element identification in UI automation.

BACKGROUND

In computer vision (CV)-based UI automation, the targeting or locating of UI elements (also called "graphical elements" herein) that should be operated on (e.g., by a robotic process automation (RPA) robot typing in a graphical element, clicking a button, etc.) is done using anchors. While creating a workflow, a developer indicates the target graphical element on screen. In order to differentiate the location of the target graphical element from other similar UI elements, anchors may be used.

However, detection of duplicate anchors requires user intervention and manual input. Furthermore, selection of anchors may vary from one user to another. Accordingly, an improved approach may be beneficial.

SUMMARY

Certain embodiments of the present invention may provide solutions to the problems and needs in the art that have not yet been fully identified, appreciated, or solved by current RPA technologies. For example, some embodiments of the present invention pertain to automatic anchor determination for target graphical element identification in UI automation.

In an embodiment, a computer-implemented method includes checking whether a target graphical element in an image can be identified with at least a confidence. When the target cannot be identified with at least the confidence, the computer implemented method also includes automatically determining additional anchors within a proximity of the target graphical element and storing the automatically determined additional anchors and the target graphical element for use in identifying the target graphical element at runtime.

In another embodiment, a non-transitory computer-readable medium stores a program for performing automatic anchor determination for target graphical element identification in UI automation at design time. The computer program is configured to cause at least one processor to check whether a target graphical element in an image can be identified with at least a confidence at design time. When the target cannot be identified with at least the confidence, the computer program is also configured to cause the at least one processor to automatically determine additional anchors within a proximity of the target graphical element and store the automatically determined additional anchors and the target graphical element for use in identifying the target graphical element at runtime. The proximity is defined by a radius from the target graphical element.

In yet another embodiment, a computing system includes memory storing computer program instructions for performing automatic anchor determination for target graphical element identification in a UI automation at runtime and at least one processor configured to execute the computer program instructions. The computer program instructions are configured to cause the at least one processor to search for a target graphical element and one or more visible anchors matching automatically determined anchors that were previously determined for the target graphical element. The computer program instructions are also configured to cause the at least one processor to use geometric relationships between the one or more matching visible anchors and the target graphical element to identify the target graphical element in a UI.

In still another embodiment, a computing system includes memory storing computer program instructions for performing target graphical element detection in a UI automation and at least one processor configured to execute the computer program instructions. The computer program instructions are configured to cause the at least one processor to search for a target graphical element and one or more visible anchors matching anchors associated with the target graphical element. When the target graphical element is found in the search, the computer program instructions are configured to cause the at least one processor to use geometric relationships between the one or more matching visible anchors and the target graphical element to identify the target graphical element in a UI. When the target graphical element is not found in the search, the computer program instructions are configured to cause the at least one processor to attempt a remedial action to make the target graphical element visible.

In another embodiment, a computer-implemented method for performing target graphical element identification in a UI automation includes searching, by an RPA robot, for a target graphical element and one or more visible anchors matching anchors associated with the target graphical element. When the target graphical element is not found in the search, the computer-implemented method includes attempting a remedial action to make the target graphical element visible, by the RPA robot.

In yet another embodiment, a non-transitory computer-readable medium stores a computer program for performing target graphical element detection in a UI automation. The computer program is configured to cause at least one processor to search for a target graphical element and one or more visible anchors matching anchors associated with the target graphical element. When the target graphical element is not found in the search, the computer program is configured to cause at least one processor to receive information from a server running a VM pertaining to applications that are running, windows that are open, and locations of the open windows, and attempt a remedial action by using the received information to generate mouse click information, key press information, or both, that cause the server to move a window associated with the target graphical element into a foreground of the UI, launch an application associated with the target graphical element, or both.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 10D illustrates an application window with a "Submit" button surrounded by a bounding box, according to an embodiment of the present invention.

Unless otherwise indicated, similar reference characters denote corresponding features consistently throughout the attached drawings.

DETAILED DESCRIPTION OF THE EMBODIMENTS

Figure 1:
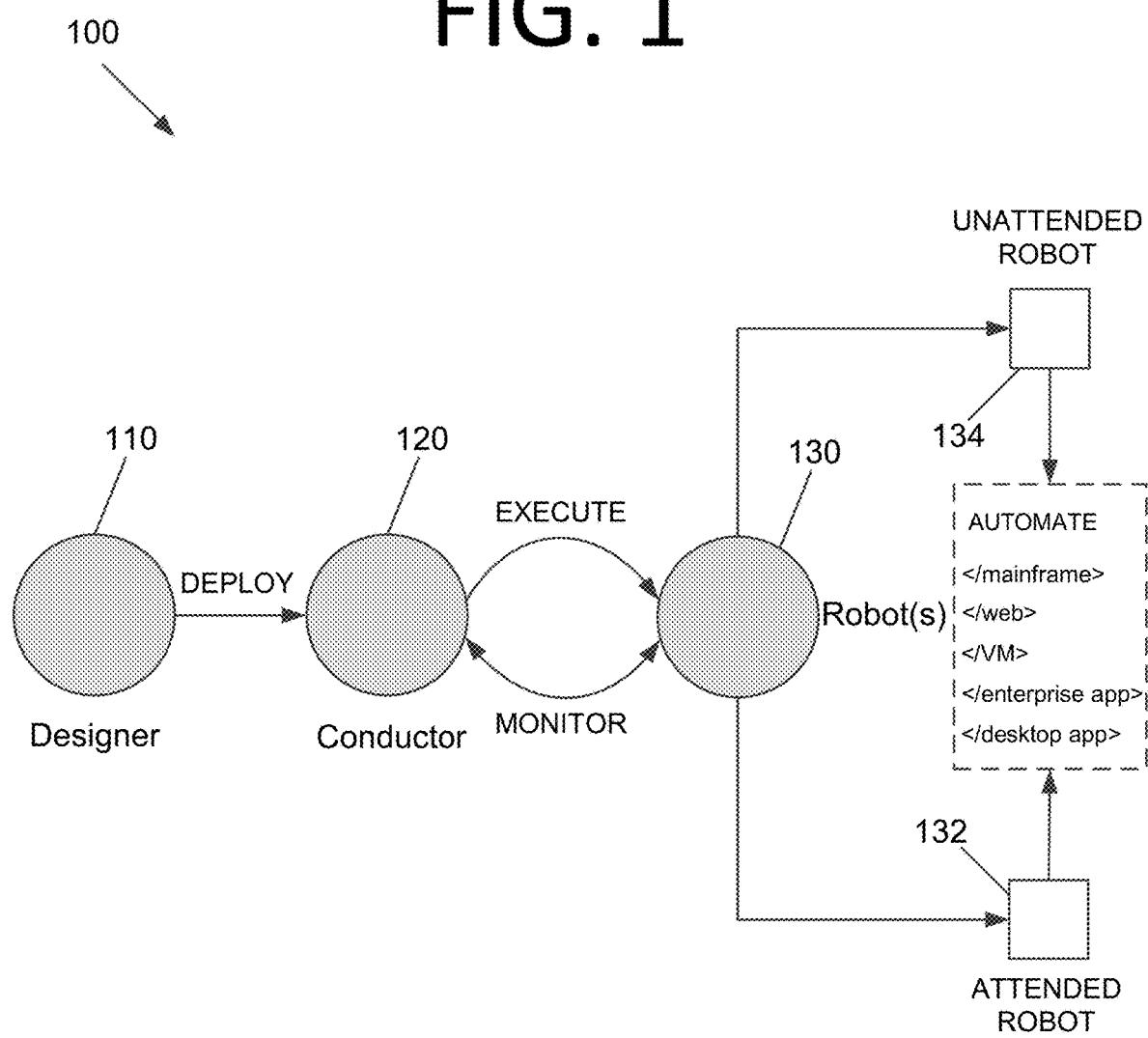
FIG. 1 is an architectural diagram illustrating a robotic process automation (RPA) system, according to an embodiment of the present invention.

Some embodiments pertain to automatic anchor determination for target graphical element identification in UI automation. As used herein, "graphical element" and "UI element" are used interchangeably. Such embodiments may provide a context-based mechanism that discriminates between duplicate target candidates. More specifically, additional anchors may be determined and automatically added for a target UI element that provide context and are visible in the area surrounding the target.

During design time, a target UI element may be indicated by a user of a designer application (e.g., UiPath Studio™) and a corresponding anchor may be determined. When a pair of UI elements is found having the same or similar characteristics and/or relationships to the target-anchor pair (see FIG. 6C, for example), additional anchors may be automatically identified without requesting user input. The additional anchors may be selected from the UI elements within a radius of the target UI element in some embodiments. The multiple additional anchors may be added since it is not necessarily known at design time which anchors will actually be present at runtime. In some situations, it may happen that just a single optional anchor is collected if there are no others within the search range. However, this is unlikely for most real-world implementations. During runtime, the multiple optional anchors are searched to accommodate for runtime changes. Automatic anchor detection can be applied to automations in both desktop applications and virtual environments in some embodiments.

Per the above, some embodiments employ a multi-anchor UI element identification approach. This may occur when the target graphical element image by itself is not unique in the UI. In such a case, multiple additional anchors may be selected automatically or designated by the user.

Anchors are other UI elements that can be used to assist in uniquely identifying a target UI element. For instance, if multiple text fields of the same shape and size are included in a UI, searching for a text field image alone is insufficient to uniquely identify a given text field. Accordingly, some embodiments look for additional information in order to uniquely identify the desired target UI element. Using the text field example, a text field for entering a first name may appear to the right of the label "First Name". This first name label may be set as an "anchor" to help to uniquely identify the text field, which is the "target".

Various positional and/or geometric associations between the target and the anchor may be used in some embodiments, potentially within one or more tolerances, to uniquely identify the target. For instance, the center of bounding boxes for the anchor and the target may be used to define a line segment. This line segment could then be required to have a certain length within a tolerance and/or slope within a tolerance to uniquely identify the target using the target/anchor pair. However, any desired position of the location associated with the target and/or anchors may be used in some embodiments without deviating from the scope of the invention. For instance, the endpoints of the line segments may be in the center, upper left corner, upper right corner, lower left corner, lower right corner, any other location on the border of the bounding box, any location within the bounding box, a location outside of the bounding box as identified in relation to the bounding box properties, a combination thereof (e.g., the center of the bounding box for the target and the upper right corner of the bounding box for the anchor), etc. In certain embodiments, the target and one or more anchors may have different locations within or outside of their bounding boxes that are used for geometric matching.

Per the above, a single anchor may not always be sufficient to uniquely identify a target element on a screen with a certain confidence. For instance, consider a web form where two text fields for entering a first name appear to the right of respective labels "First Name" in different locations on the screen. In this example, one or more additional anchors may be useful to uniquely identify a given target. Indeed, the geometric properties between the anchors and the target (e.g., line segment lengths, angles, and/or relative locations with tolerances) may be used to uniquely identify the target. In some embodiments, anchors may be automatically added until a match strength for the target exceeds the threshold.

Target and anchor graphical elements may be described using UI descriptors in some embodiments. At their core, UI descriptors identify the graphical elements (e.g., text fields, buttons, labels, menus, checkboxes, etc.). Some types of UI descriptors include, but are not limited to, selectors, CV descriptors, image matching descriptors, OCR descriptors, unified target descriptors that may utilize multiple different types of UI descriptors in series or in parallel, etc. UI descriptors may be used to compare attributes for a given UI descriptor with attributes of UI elements found at runtime in the UI.

In some embodiments, UI descriptors store the attributes of the respective UI element and its parents, e.g., in an Extensible Markup Language (XML) fragment. At runtime, the attributes for the UI elements found in the UI can be searched for matches with attributes for a respective RPA workflow activity, and if an exact match or a "close enough" match is found within a matching threshold, the UI element may be identified and interacted with accordingly. The attributes may include text-based identifiers (IDs), classes, roles, and the like. For CV, the attributes may include the type of the target element and the relation to one or more anchor elements that may be used in a multi-anchor matching approach. For OCR, the attributes may include text in the form of a stored string, for example, and text found via OCR to which the stored string was fuzzy matched during execution. Any suitable attributes and graphical element detection techniques may be used without deviating from the scope of the invention.

Some embodiments use UI descriptors that store the attributes of a UI element and its parents in an XML fragment. In modern computing systems, the operating system typically represents each user interface as a hierarchical data structure that is commonly referred to as a UI tree. An example UI tree may include a document object model (DOM) underlying a webpage rendered by a web browser application.

Selectors are a type to UI descriptor that may be used to detect UI elements in some embodiments. A selector has the following structure in some embodiments:

<node_1/><node_2/> . . . <node_N/>

The last node represents the GUI element of interest, and all previous nodes represent the parents of that element. <node_1> is usually referred to as a root node, and represents the top window of the application.

Each node may have one or more attributes that assist with correct identification of a specific level of the selected application. Each node has the following format in some embodiments:

<ui_system attr_name_1='attr_value_1' . . . attr_name_N='attr_value_N'/>

Every attribute may have an assigned value, and attributes with constant values may be selected. This is because changes to the value of an attribute each time the application is started may lead to the selector not being able to correctly identify the associated element.

A UI descriptor is a set of instructions for finding a UI element. UI descriptors in some embodiments are an encapsulated data/struct format that includes UI element selector(s), anchor selector(s), CV descriptor(s), OCR descriptor(s), unified target descriptor(s) combining two or more types of UI descriptors, a screen image capture (context), an element image capture, other metadata (e.g., the application and application version), a combination thereof, etc. The encapsulated data/struct format may be extensible with future updates to the platform and is not limited to the above definition. Any suitable UI descriptor for identifying a UI element on a screen may be used without deviating from the scope of the invention. UI descriptors may be extracted from activities in an RPA workflow and added to a structured schema that groups the UI descriptors by UI applications, screens, and UI elements.

The UI descriptors may work with a unified target that encompasses multiple or all UI element detection mechanisms through which image detection and definition are performed in some embodiments. The unified target may merge multiple techniques of identifying and automating UI elements into a single cohesive approach. A unified target descriptor chains together multiple types of UI descriptors in series, uses them in parallel, or uses at least one technique (e.g., a selector) first for a period of time and then runs at least one other technique in parallel or alternatively if the first technique does not find a match within the time period. In some embodiments, a unified target descriptor may function like a finite state machine (FSM), where in a first context, a first UI descriptor mechanism is applied, in a second context, a second UI descriptor is applied, etc. The unified target may prioritize selector-based and driver-based UI detection mechanisms and fall back on CV, image matching, and/or other mechanisms to find a graphical element if the first two mechanisms are not successful in some embodiments.

In some embodiments, fuzzy matching may be employed, where one or more attributes should match with a certain accuracy (e.g., a 70% match, an 80% match, a 99% match, etc.), within a certain range, using string metrics (e.g., a Levenshtein distance, a Hamming distance, a Jaro-Winkler distance, etc.), a combination thereof, etc. One of ordinary skill in the art will appreciate that the similarity measure may quantify an amount of similarity, as well as an amount of mismatch between two attribute values. Furthermore, in various embodiments, the similarity threshold may represent a maximum amount of mismatch or a minimum amount of similarity required for a match.

Depending on the chosen manner of computing the similarity measure, the similarity threshold can have various interpretations. For instance, the similarity threshold may indicate a maximum count of characters that can differ between the two strings or a fractional degree of mismatch calculated as a proportion of the total count of characters (e.g., combined string length). In some embodiments, the similarity threshold may be re-scaled to a predetermined interval, such as between 0 and 1, between 0 and 100, between 7 and 34, etc. In one nonlimiting example, a relatively high similarity threshold (e.g., close to 1 or 100%) indicates a requirement for an almost exact match, i.e., the value of the fuzzy attribute in the runtime target is only allowed to depart very slightly from the value of the respective attribute in the design time target. In contrast, when the similarity threshold is relatively low (e.g., close to 0), almost any values of the respective fuzzy attribute are considered as matching.

In certain embodiments, the matching tolerance may differ on a per-attribute basis. For instance, an exact match may be required for one or more attributes (e.g., it may be desired to find a certain exact name) and fuzzy matching may be performed for one or more other attributes. The number and/or type of attributes used from each graphical element detection technique may be custom-specified by the RPA developer in some embodiments.

In some embodiments, attributes may be stored as attribute-value pairs and/or attribute-value-tolerance pairs (e.g., fuzzy matching). Attribute-value pairs may indicate a name and a type of UI element represented by the respective node in some embodiments. However, one skilled in the art will appreciate that there may be multiple ways to represent a location of a specific node within a UI tree other than a list of attribute-value pairs without deviating from the scope of the invention.

These attribute-value pairs and/or attribute-value-tolerance pairs may be stored in a tag in some embodiments, and each tag may include a sequence of characters with the sequence book-ended by implementation-specific delimiters (e.g., beginning with "<" and ending with "/>"). Attribute-value pairs may indicate a name and a type of UI element represented by the respective node in some embodiments. However, one skilled in the art will appreciate that there may be multiple ways to represent a location of a specific node within a UI tree other than a list of attribute-value pairs without deviating from the scope of the invention.

To enable a successful and ideally unambiguous identification by an RPA robot, some embodiments represent each UI element using an element ID characterizing the respective UI element. The element ID in some embodiments indicates a location of a target node within a UI tree, where the target node represents the respective UI element. For instance, the element ID may identify a target node/UI element as a member of a selected subset of nodes. The selected subset of nodes may form a genealogy, i.e., a line of descent through the UI tree where each node is either an ancestor or a descendant of another node.

In some embodiments, the element ID includes an ordered sequence of node indicators, the sequence tracing a genealogical path through the UI tree, and the path ending in the respective target node/UI element. Each node indicator may represent a member of an object hierarchy of the respective UI and its position within the sequence consistent with the respective hierarchy. For instance, each member of the sequence may represent a descendant (e.g., a child node) of the previous member, and may have the following member as a descendant (e.g., a child node). In one HyperText Markup Language (HTML) example, an element ID representing an individual form field may indicate that the respective form field is a child of an HTML form, which in turn is a child of a specific section of a webpage, etc. The genealogy does not need to be complete in some embodiments.

Some embodiments may use one or more multi-anchor matching attributes. Anchors are other UI elements that can be used to assist in uniquely identifying a target UI element. For instance, if multiple text fields are included in a UI, searching for a text field alone is insufficient to uniquely identify a given text field. Accordingly, some embodiments look for additional information in order to uniquely identify a given UI element. Using the text field example, a text field for entering a first name may appear to the right of the label "First Name". This first name label may be set as an "anchor" to help to uniquely identify the text field, which is the "target".

Various positional and/or geometric associations between the target and the anchor may be used in some embodiments, potentially within one or more tolerances, to uniquely identify the target. For instance, the center of bounding boxes for the anchor and the target may be used to define a line segment. This line segment could then be required to have a certain length within a tolerance and/or slope within a tolerance to uniquely identify the target using the target/anchor pair. However, any desired position of the location associated with the target and/or anchors may be used in some embodiments without deviating from the scope of the invention. For instance, the point for drawing line segments may be in the center, upper left corner, upper right corner, lower left corner, lower right corner, any other location on the border of the bounding box, any location within the bounding box, a location outside of the bounding box as identified in relation to the bounding box properties, etc. In certain embodiments, the target and one or more anchors may have different locations within or outside of their bounding boxes that are used for geometric matching.

Per the above, a single anchor may not always be sufficient to uniquely identify a target graphical element on a screen with a certain confidence. For instance, consider a web form where two text field for entering a first name appear to the right of respective labels "First Name" in different locations on the screen. In this example, one or more additional anchors may be useful to uniquely identify a given target. The geometric properties between the anchors and the target (e.g., line segment lengths, angles, and/or relative locations with tolerances) may be used to uniquely identify the target. The user may be required to continue to add anchors until a match strength for the target exceeds the threshold.

Certain embodiments may be employed for robotic process automation (RPA). FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, FSMs, and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point, or one of the aggregation points, with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 may be triggered by user events or be scheduled to automatically happen, and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments or on physical machines, and can automate many processes. Unattended robots 134 may be responsible for remote execution, monitoring, scheduling, and providing support for work queues. Debugging for all robot types may be run from designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, versioning, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Versioning may include management of unique instances of some process or configuration in some embodiments. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
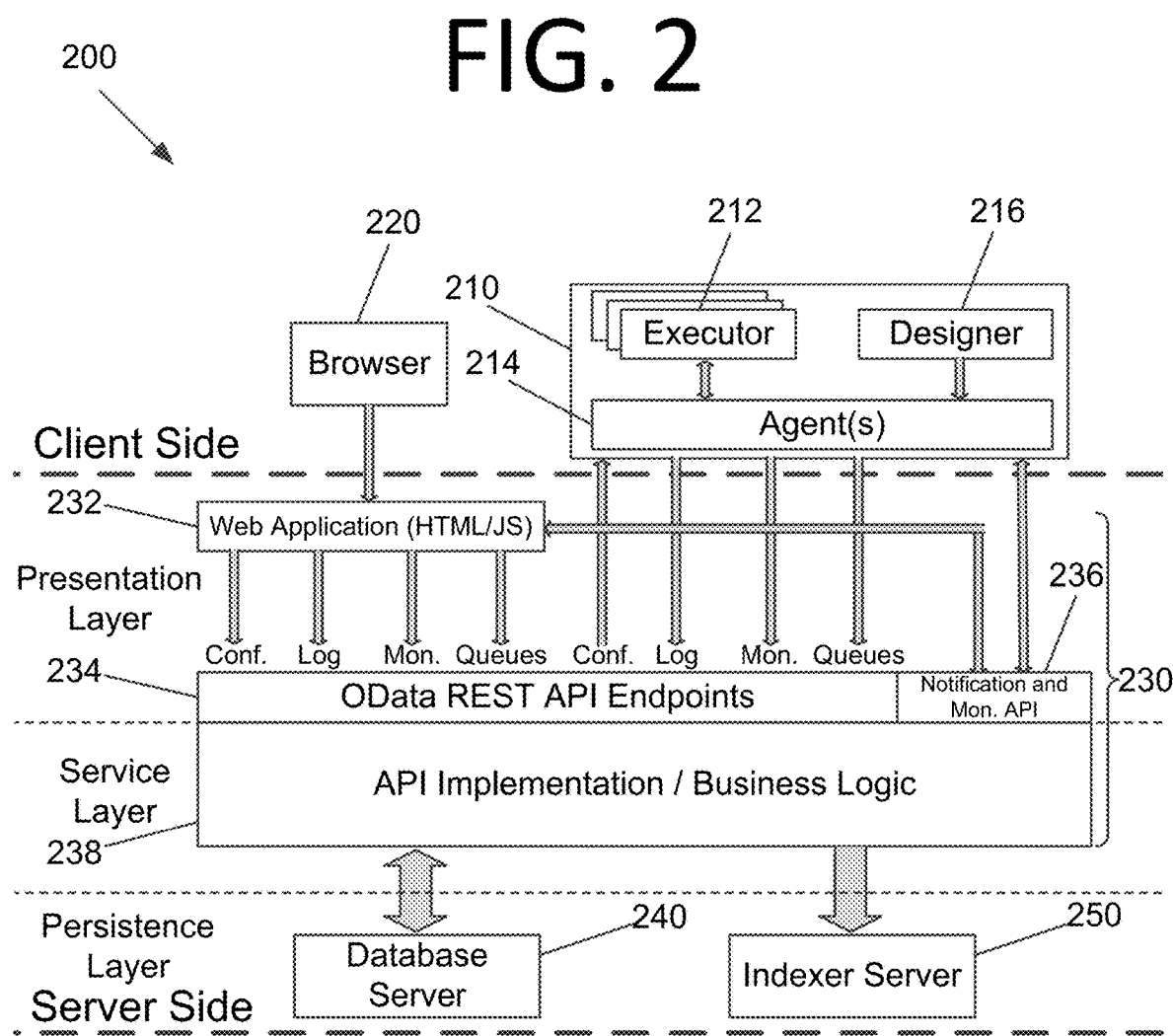
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
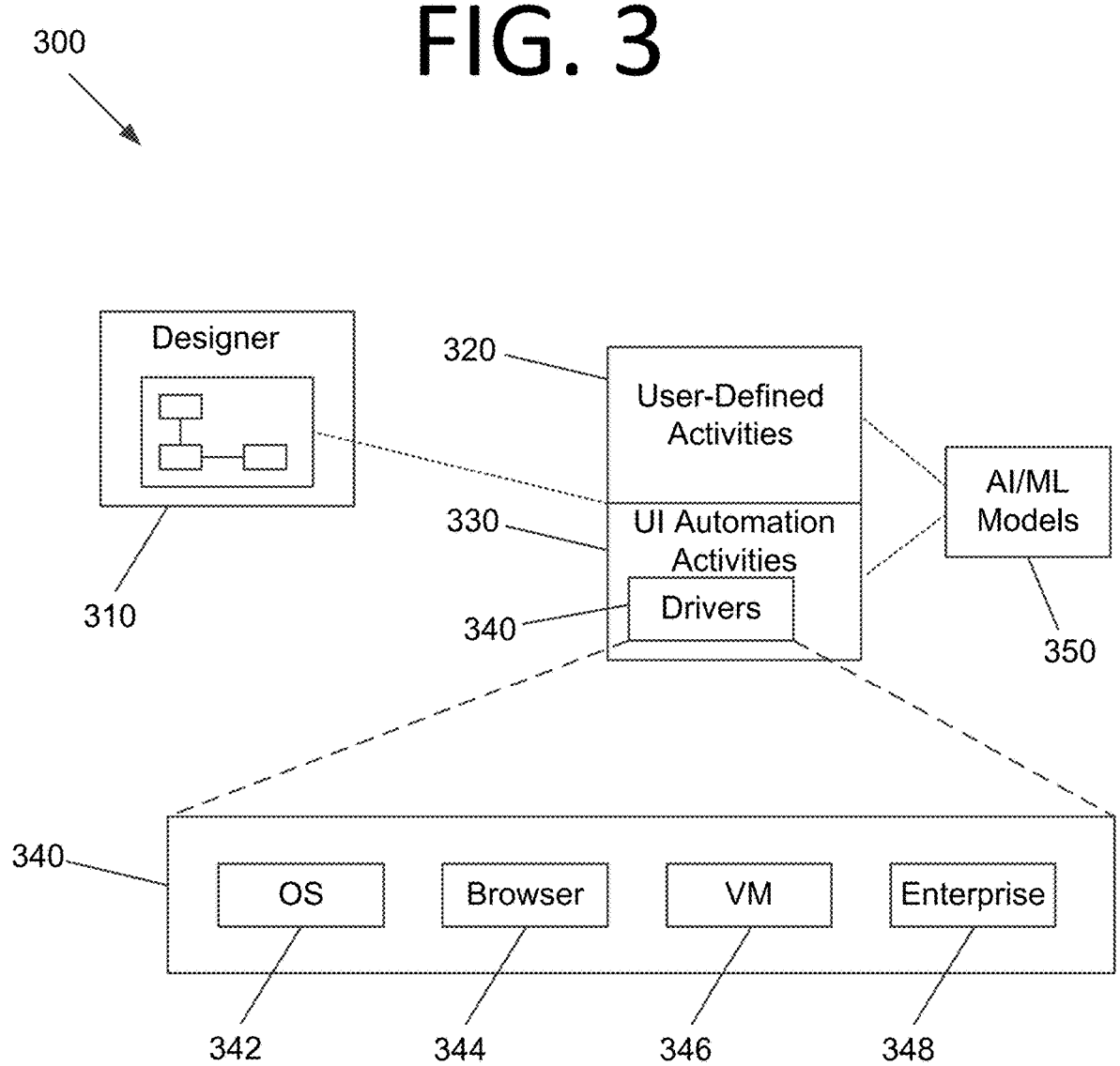
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, drivers 340, and AI/ML models 350, according to an embodiment of the present invention. Per the above, a developer uses designer 310 to develop workflows that are executed by robots. Workflows may include user-defined activities 320 and UI automation activities 330. User-defined activities 320 and/or UI automation activities 330 may call one or more AI/ML models 350 in some embodiments, which may be located locally to the computing system on which the robot is operating and/or remotely thereto. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with applications through the UI layer. In certain embodiments, UI automation activities 300 may simulate" user input through window messages or the like, for example. UI automation activities 330 facilitate these interactions via drivers 340 and/or AI/ML models 350 that allow the robot to interact with the desired software. For instance, drivers 340 may include OS drivers 342, browser drivers 344, VM drivers 346, enterprise application drivers 348, etc. One or more of AI/ML models 350 may be used by UI automation activities 330 in order to determine perform interactions with the computing system. In some embodiments, AI/ML models 350 may augment drivers 340 or replace them completely. Indeed, in certain embodiments, drivers 340 are not included.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
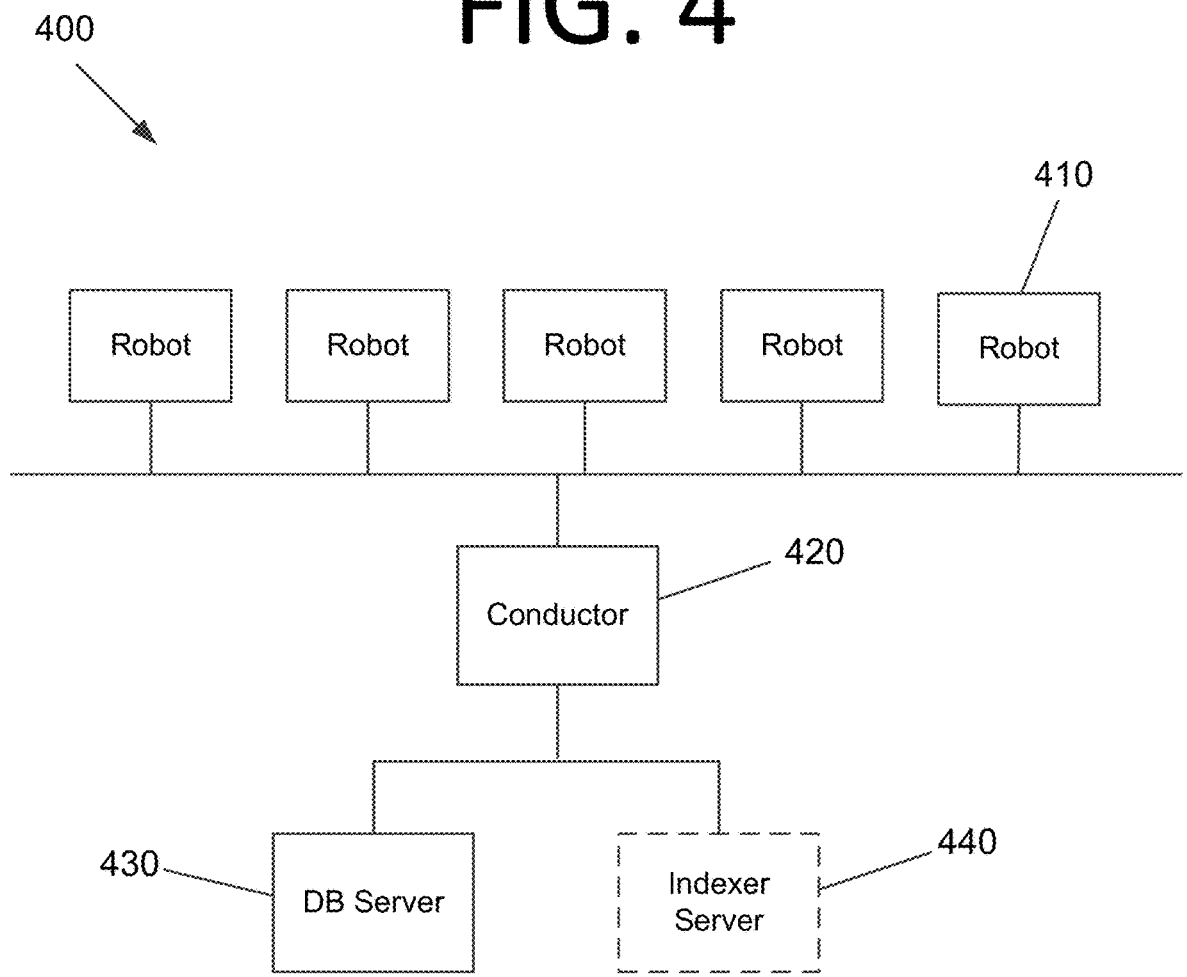
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client and/or server software may be used without deviating from the scope of the invention. For instance, the conductor may run a server-side application that communicates with non-web-based client software applications on the client computing systems.

Figure 5:
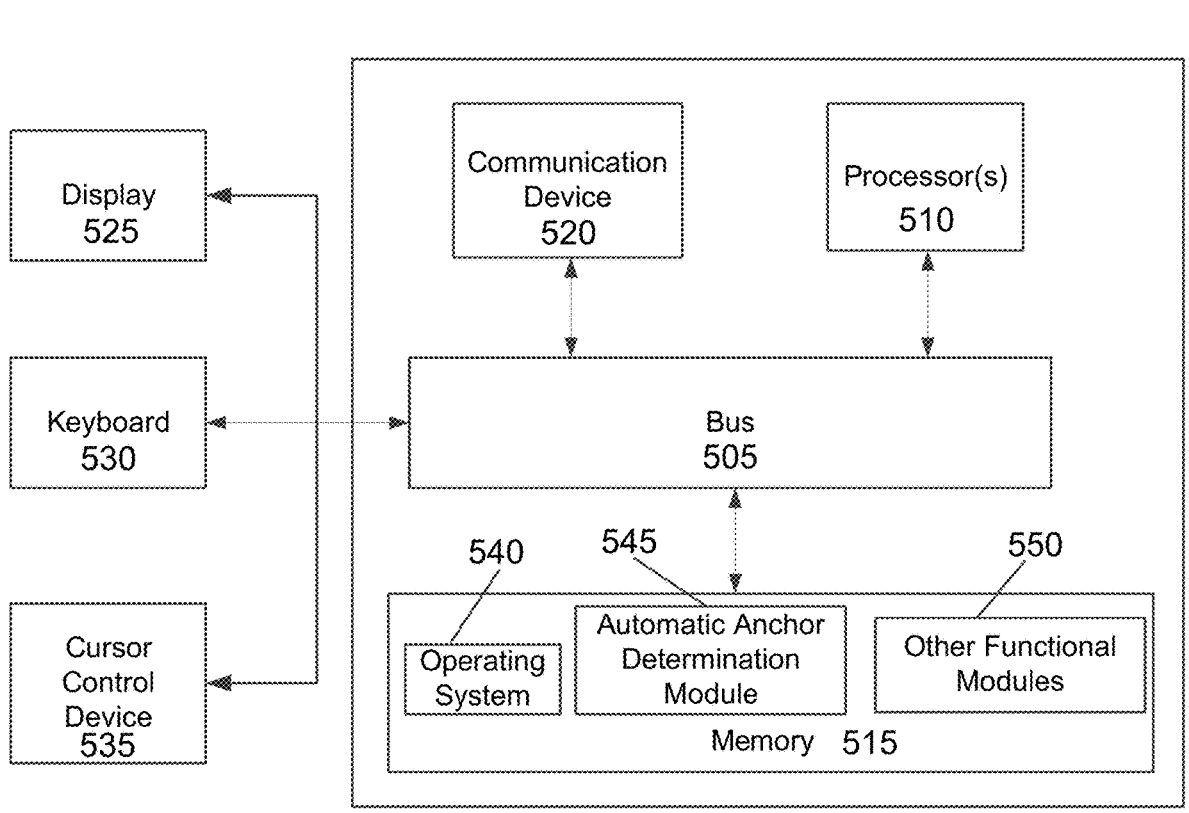
FIG. 5 is an architectural diagram illustrating a computing system configured to perform automatic anchor determination for target graphical element identification in UI automation, according to an embodiment of the present invention.

FIG. 5 is an architectural diagram illustrating a computing system 500 configured to perform automatic anchor determination for target graphical element identification in UI automation, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include an automatic anchor determination module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6A:
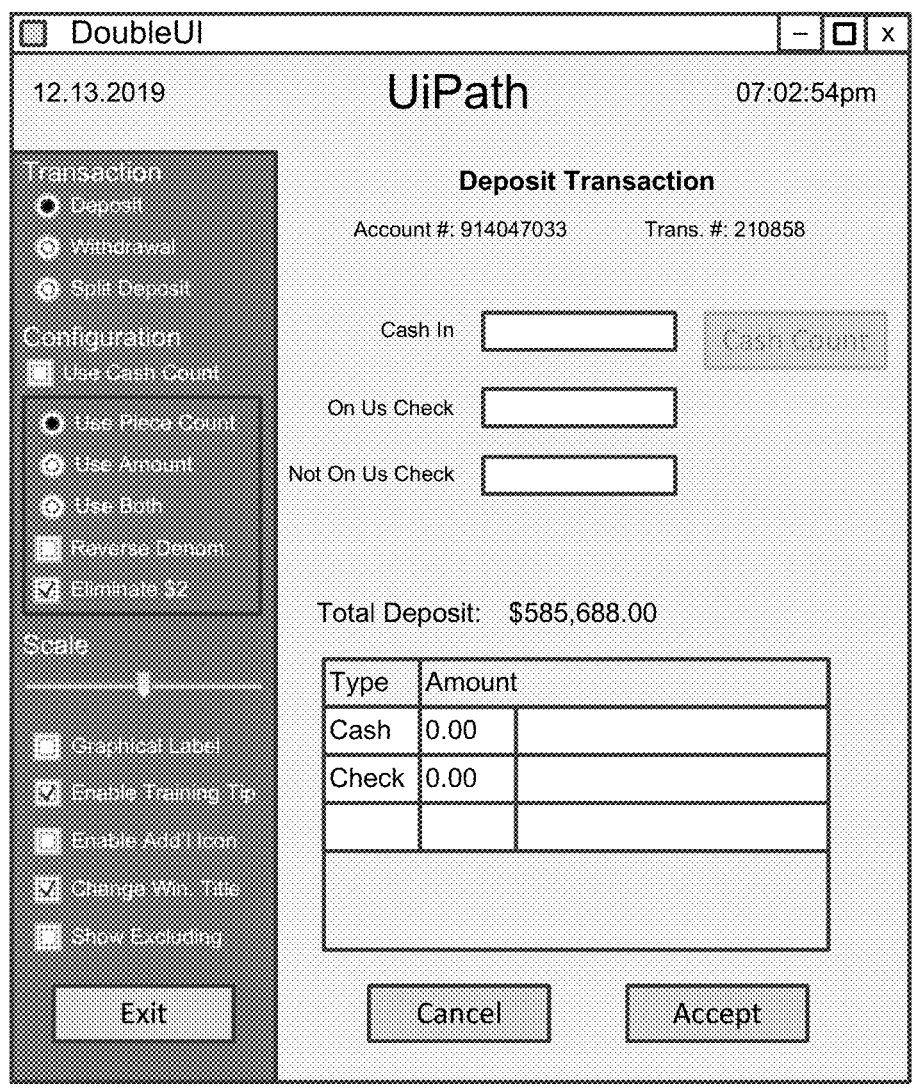
FIG. 6A illustrates a transaction application window with a certain state, according to an embodiment of the present invention.
Figure 6B:
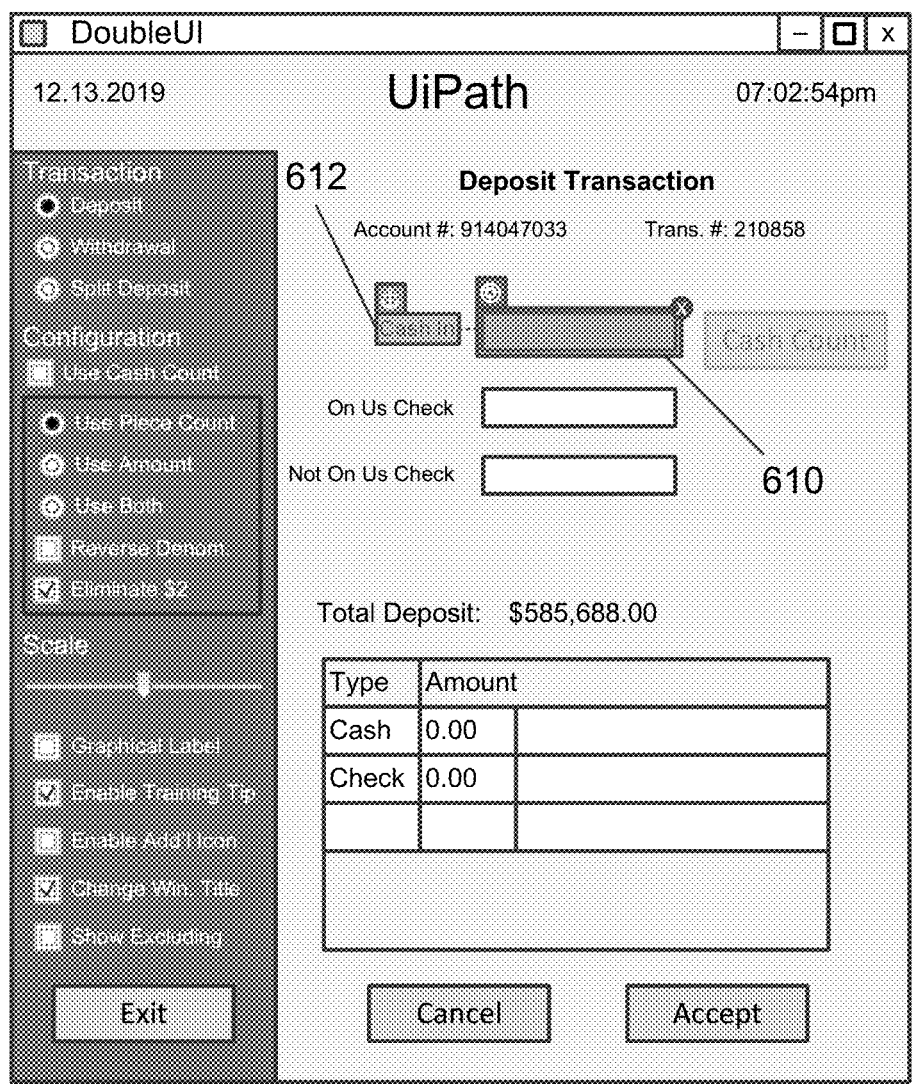
FIG. 6B illustrates the UI of the transaction application window with an indication of a target and an anchor, according to an embodiment of the present invention.
Figure 6C:
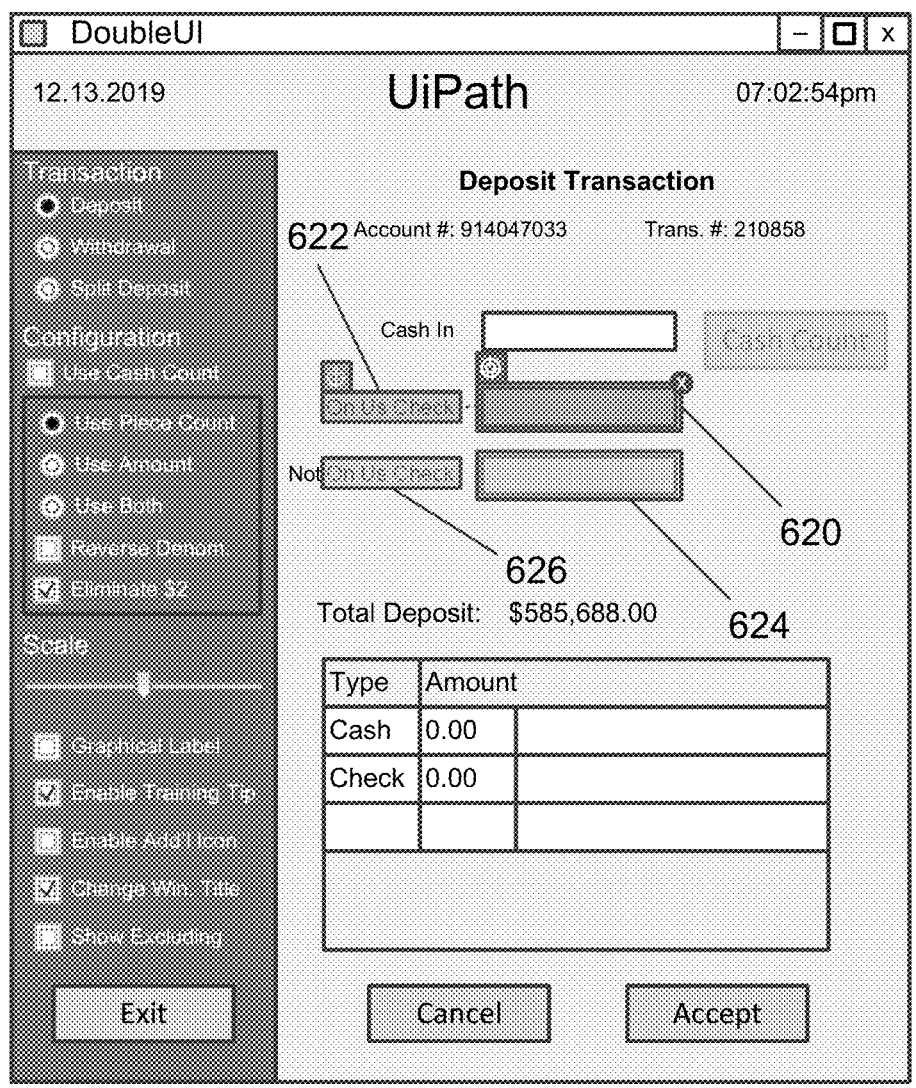
FIG. 6C illustrates the UI of the transaction application window where the indicated target and anchor do not uniquely identify the target, according to an embodiment of the present invention.

FIG. 6A illustrates a transaction application window 600 with a certain state, according to an embodiment of the present invention. For instance, transaction application window 600 may be as it appears at a certain point during a deposit transaction. Using a designer application, such as designer application 110 of FIG. 1 or designer application 310 of FIG. 3, a user may enable functionality in some embodiments that allows the user to indicate graphical elements on the screen. For instance, the user may designate a target UI element to be interacted with by an activity in an RPA workflow. Turning to FIG. 6B, if the user selects text field 610 as a target and "Cash In" label 612 as an anchor, this pair is sufficient to uniquely identify text field 610 on the screen, and additional anchors do not need to be identified. In this embodiment, the "x" in the circle appears for the last-selected target or anchor UI element. In some embodiments, the automatic anchor determination logic may automatically select an anchor without requiring user input after it determines that the target alone is not unique on the screen (e.g., selecting the closest anchor, selecting the first anchor that is found where the target and anchor combination uniquely identifies the target, selecting the first anchor that is clockwise or counterclockwise from a certain starting direction etc.).

However, some target-anchor pairs may not be unique under the logic that is employed for target detection. For instance, consider FIG. 6C. In this example, the user has selected text field 620 as a target and "On Us Check" label 622 as an anchor. However, text field 624 and the "On Us Check" portion of "Not On Us Check" label 626 are identical to the images of text field 620 and "On Us Check" label 622 respectively. Furthermore, the length and angle of the line segments between the bounding boxes for these pairs is also identical. Thus, the designer application causes text field 624 and the "On Us Check" portion of "Not On Us Check" label 626 to be highlighted so the user can see the duplicate detection.

Figure 6D:
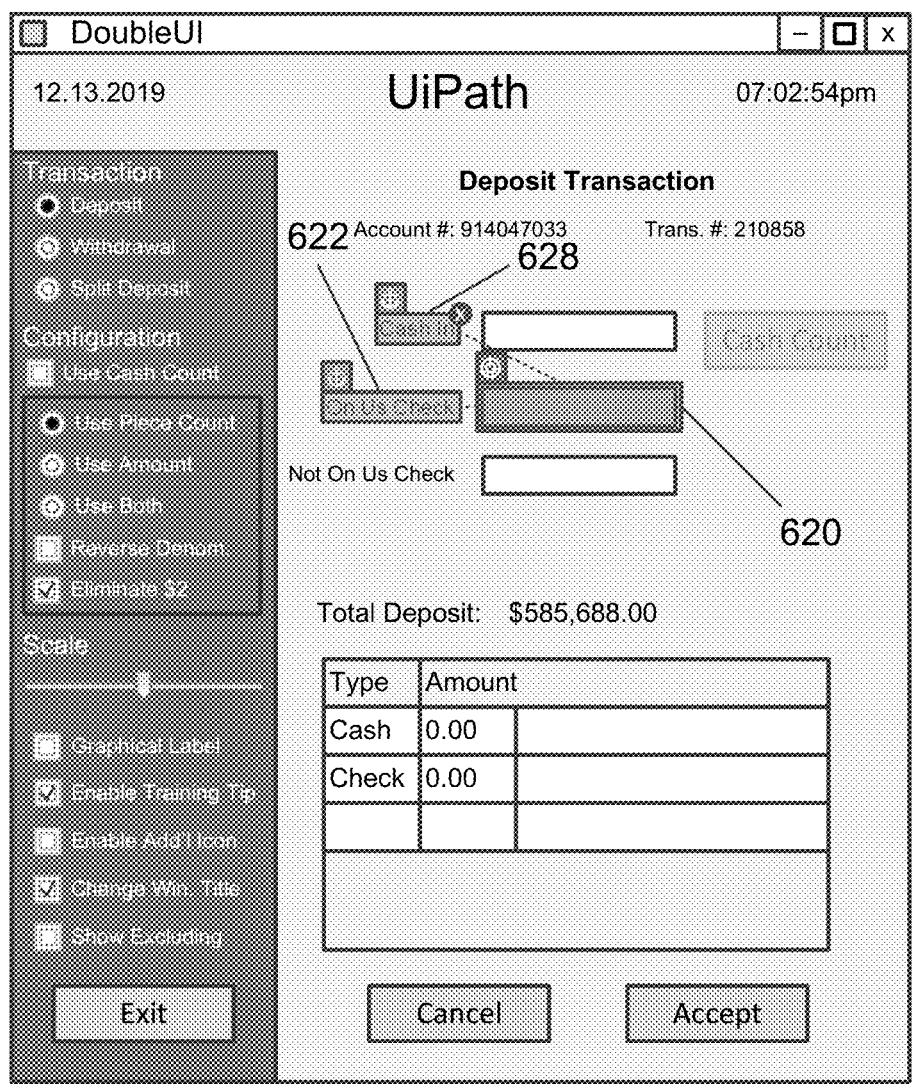
FIG. 6D illustrates the transaction application window where the combination of the target and multiple anchors uniquely identifies the target, according to an embodiment of the present invention.

In order to remedy this issue, one or multiple anchors may automatically be selected. Turning to FIG. 6D, the selection and inclusion of "Cash In" label 628 allows for unique identification of text field 620. For instance, while the length and angle of the line segments between the bounding boxes for text field 620 and "On Us Check" label 622 and for text field 624 and the "On Us Check" portion of "Not On Us Check" label 626 are the same, the length and angle of line segments between text field 620 and "Cash In" label 628 and between text field 624 and "Cash In" label 628 are different.

Figure 6E:
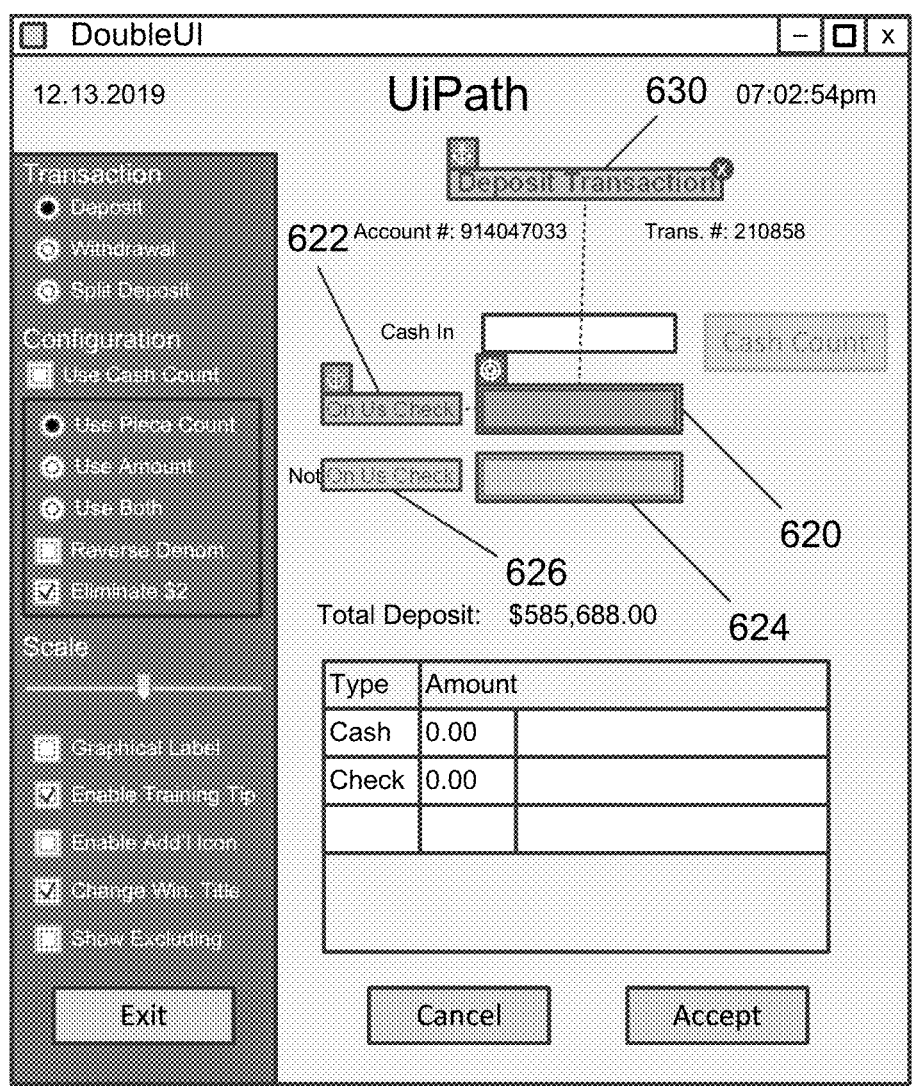
FIG. 6E illustrates the transaction application window with the combination of the target and multiple anchors do not uniquely identify the target, according to an embodiment of the present invention.

However, not all additional anchor selections allow for unique identification for all detection logic. For instance, in FIG. 6E, if only angle relationships between segments are used, segments between "Deposit Transaction" label 630 and text field 620 and between "Deposit Transaction" label 630 and text field 624 have similar angles that may not sufficiently deviate from a tolerance. This may also occur if lengths are also used, but a tolerance for deviation in lengths encompasses both segments. Tolerances may be used to accommodate for changes in the UI for the application and/or changes in screen resolution that occur between design time and runtime, for example. Angle tolerances (e.g., 1%, 2%, 5%, 1°, 2°, 5°, etc.) and/or segment length tolerances (e.g., 1%, 2%, 5%, 1 normalized pixel, 5 normalized pixels, 20 normalized pixels, etc.) may be used in some embodiments.

Figure 6F:
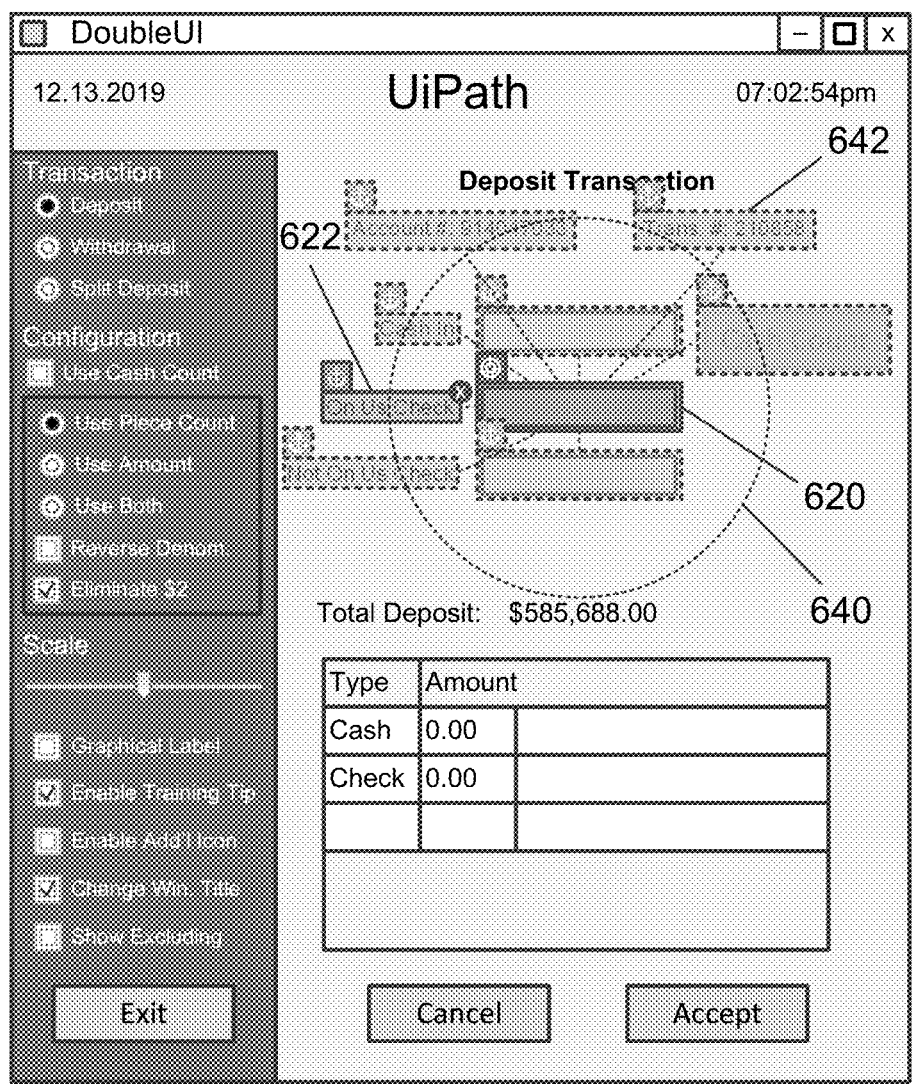
FIG. 6F illustrates the transaction application window where all additional anchors within a certain radius of the target are identified and selected, but are not visible to the user, according to an embodiment of the present invention.

FIG. 6F illustrates transaction application window 600 where all additional anchors 642 within a certain radius 640 of target 620 are identified and selected, but are not visible to the user, according to an embodiment of the present invention. In some embodiments, the radius is defined base on normalized pixels that accommodate for different numbers and/or sizes of pixels in different displays. For instance, MacBook® retinal displays are approximately three times smaller than the pixels of most other displays.

In this embodiment, the user selects "On Us Check" label 622 as a first anchor. Since this target/anchor combination does not uniquely identify target 620, additional anchors 642 within a radius 640 are identified. The anchors are within the "context" of the target. As used in this example, "context" refers to the other UI elements in the application.

By capturing additional anchors 642 within radius 640, this may provide more reliable target identification at runtime. This includes cases where at least one of the UI elements in the application of the target changes between design time and runtime, another window partially covers the application window for the target at runtime, etc. In some embodiments, the captured additional anchors at design time may not all be within the same application window, such as in a case where a window for another application partially covers the window of the application associated with the target and/or elements of the other application are within the radius. This may particularly be the case when recorded screenshots are being processed and indicated for process extraction, for example.

The additional anchors and/or radius may (see FIG. 6G) or may not (see FIG. 6F) be displayed to the user in some embodiments. If the automatic selection of additional anchors fails (e.g., there are no additional anchors within the radius, the additional anchors do not allow for unique identification of the target, etc.), the designer application may ask the user for additional input (e.g., selection of one or more anchors that are outside the radius, increasing the radius, etc.). In certain embodiments, the radius may automatically be increased (i.e., extended) if unique identification of the target cannot be performed with the initial radius, and this increase may be performed multiple times if additional elements are not found facilitating unique identification. If the target still cannot be uniquely identified after increasing the radius to a certain size, the user may be asked for additional input.

In some embodiments, multiple radii may be used, and additional anchors may be grouped based on the first radius in which they were detected. At runtime, the UI automation application (e.g., an RPA robot) may then use anchors for the first radius, and if this does not uniquely identify the target, and/or the anchors are not found, use the second radius anchors, and so on. Any suitable number and size of radii may be used without deviating from the scope of the invention.

In some embodiments, some potential anchors may have a lot of non-element area or white space. Whitespace may include the sections of a UI that is unused or space around an object. In certain instance, there may be no graphical elements near the target graphical element, and thus, no suitable anchors to pick up within a certain radius. In some embodiments, the algorithm will pick up elements in order of distance from the target UI element, so even if no elements are close to the target, anchors that are further away will be found and used. In some embodiments, anchor candidates may be discarded based on certain criteria (e.g., more than a certain percentage of pixels of the anchor candidate contain white space, the anchor candidate is redundant and found multiple times within the UI, etc.).

The target and anchors are stored such that while the user is designing the workflow at design time, and subsequently during runtime, context that uniquely identifies the target is automatically selected. Thus, for each target where the single target/anchor combination does not uniquely identify the target, one or more additional anchors are automatically used for the target identification. All additional anchors are not used in some embodiments. Rather, the UI automation application may try an additional anchor and if this does not assist in uniquely identifying the target, try the next additional anchor, etc. until the target is uniquely identified. Not designating all anchors as mandatory is also novel. The combination of one mandatory anchor and multiple optional anchors in some embodiments may assist in finding the correct targets while not giving false positives or false negatives. Other combinations (e.g., only multiple mandatory anchors or only multiple optional anchors) may give either false positives or false negatives in some cases.

Figure 6G:
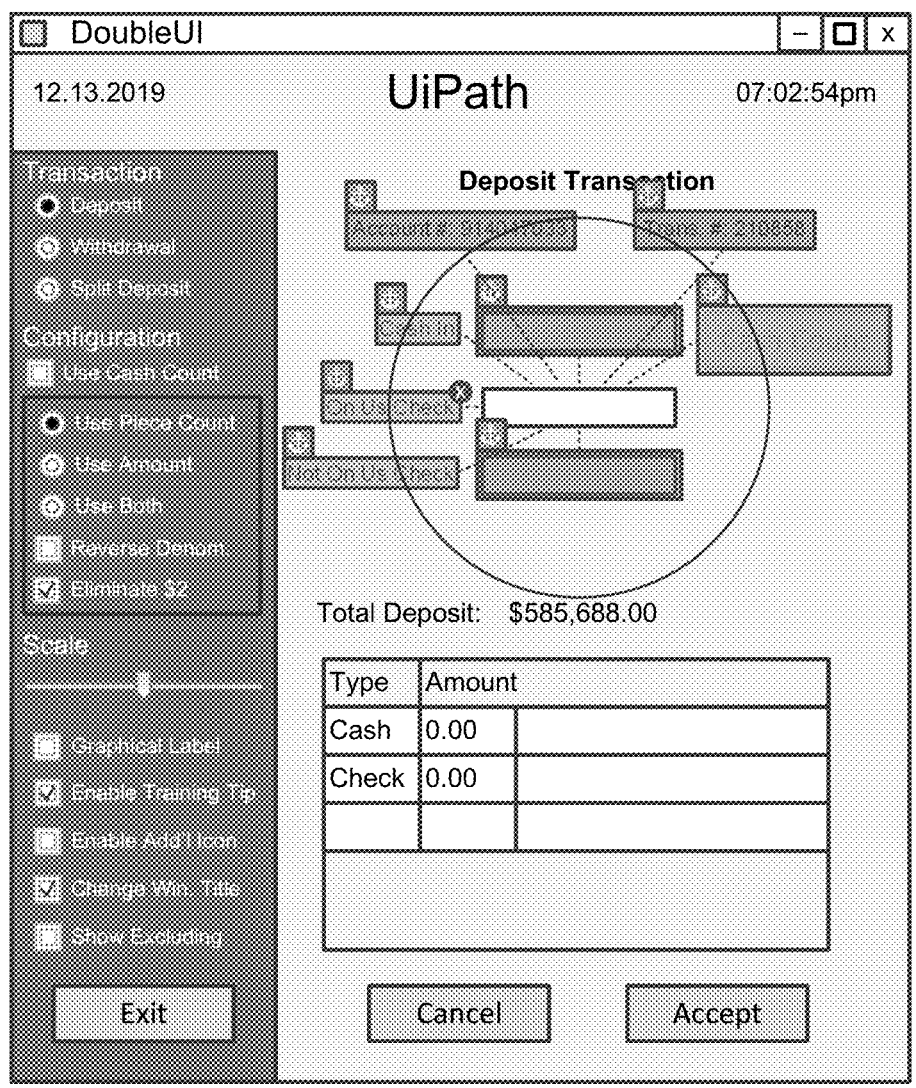
FIG. 6G illustrates the transaction application window where all additional anchors within a certain radius of the target are identified and selected, and are visible to the user, according to an embodiment of the present invention.
Figure 6H:
FIG. 6H illustrates the transaction application window where the window is reduced in size horizontally such that part of the window is not shown, according to an embodiment of the present invention.
Figure 6I:
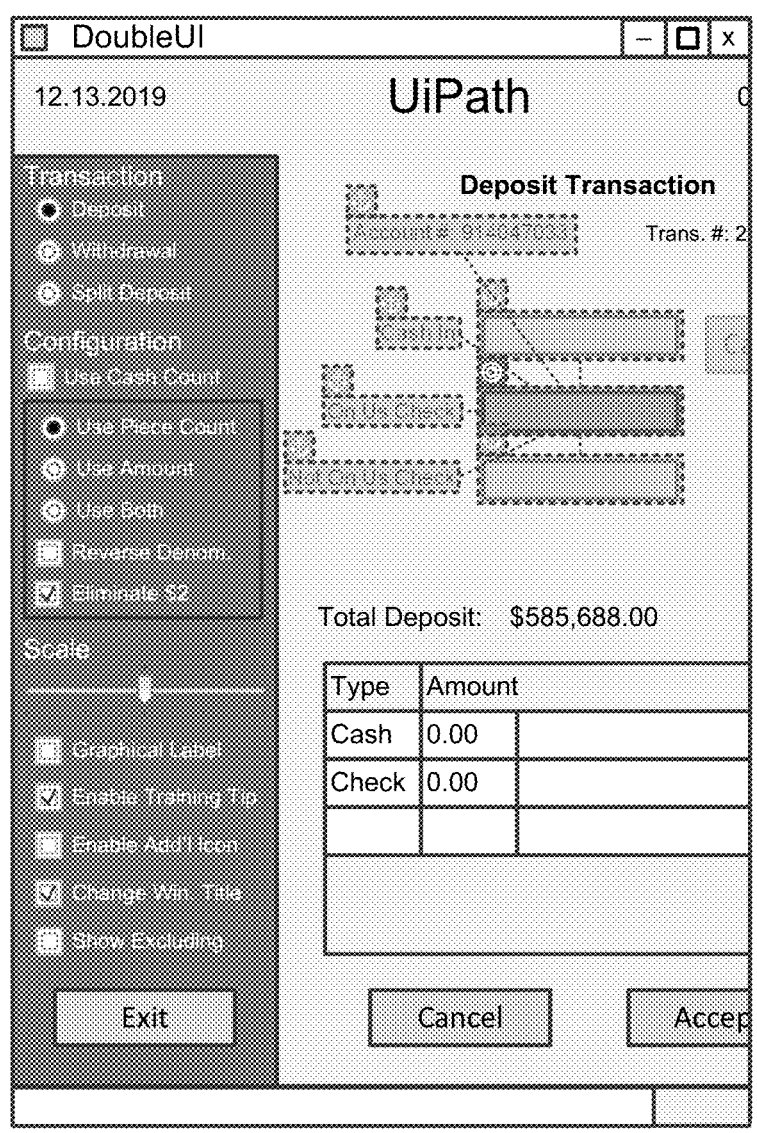
FIG. 6I illustrates the transaction application window of FIG. 6H where visible anchors in the window within a certain radius of the target are detected, according to an embodiment of the present invention.

It is possible that a scenario can arise where a window of the application with the target UI element is reduced (e.g., FIGS. 6H and 6I) or partially covered by another window (e.g., FIGS. 6J and 6K) such that some of its anchor graphical elements are covered. In FIGS. 6H and 6I, transaction application window 600 is reduced in size horizontally such that part of the window is not shown. In this case, the additional anchors for the transaction number label and the cash count button are that are visible in FIG. 6F, for example, are partially hidden such that they are not detected. However, the remaining anchors are still detected. This scenario could occur at design time if the window is sized in this manner at the user's discretion, in which case the visible additional anchors would be used later at runtime. This scenario can also subsequently occur at runtime, when a user manually resizes the window. Including all anchors in a radius at design time may help to make the UI automation more robust at runtime.

Figure 6J:
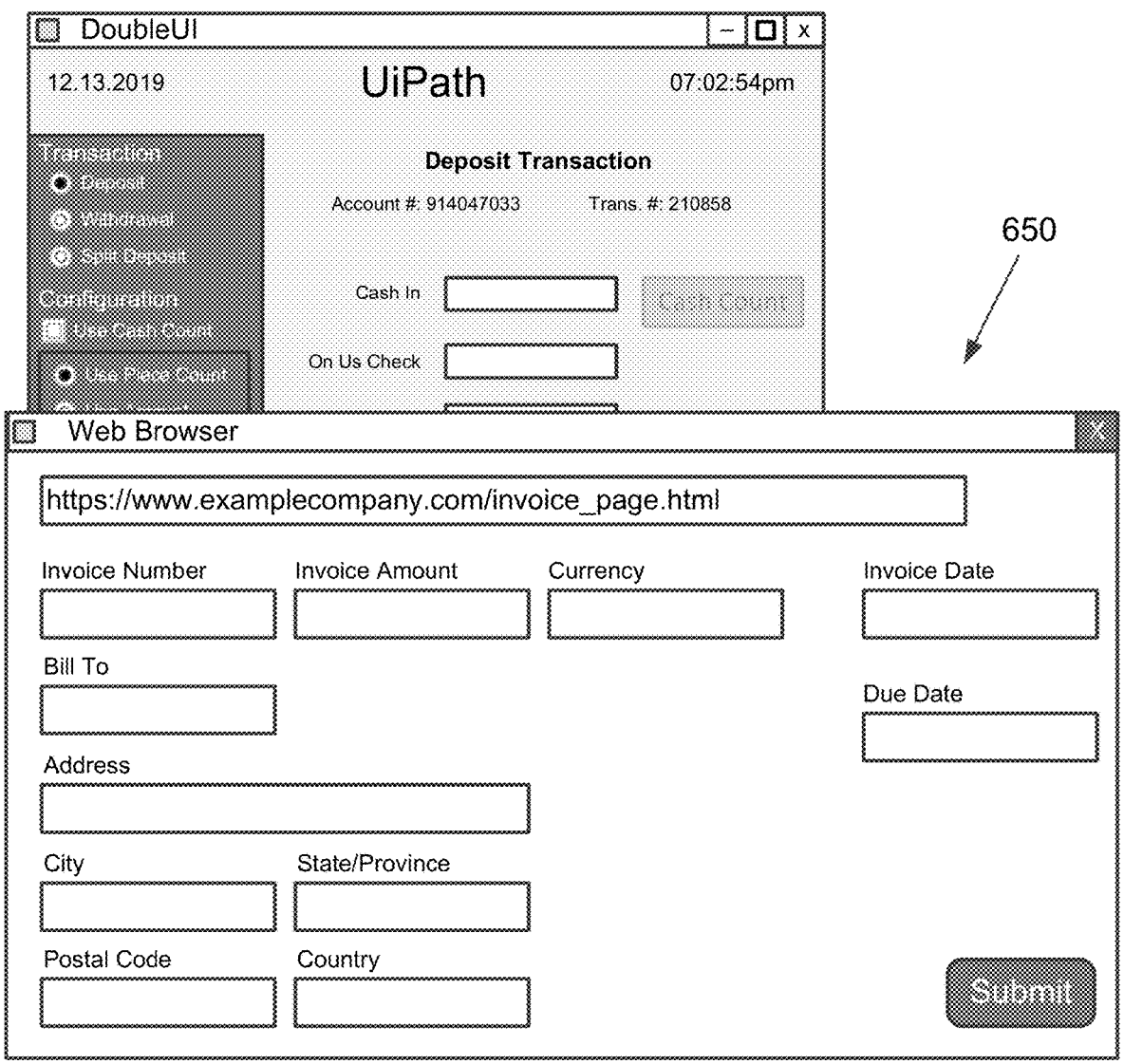
FIG. 6J illustrates another window partially covering the transaction application window, according to an embodiment of the present invention.
Figure 6K:
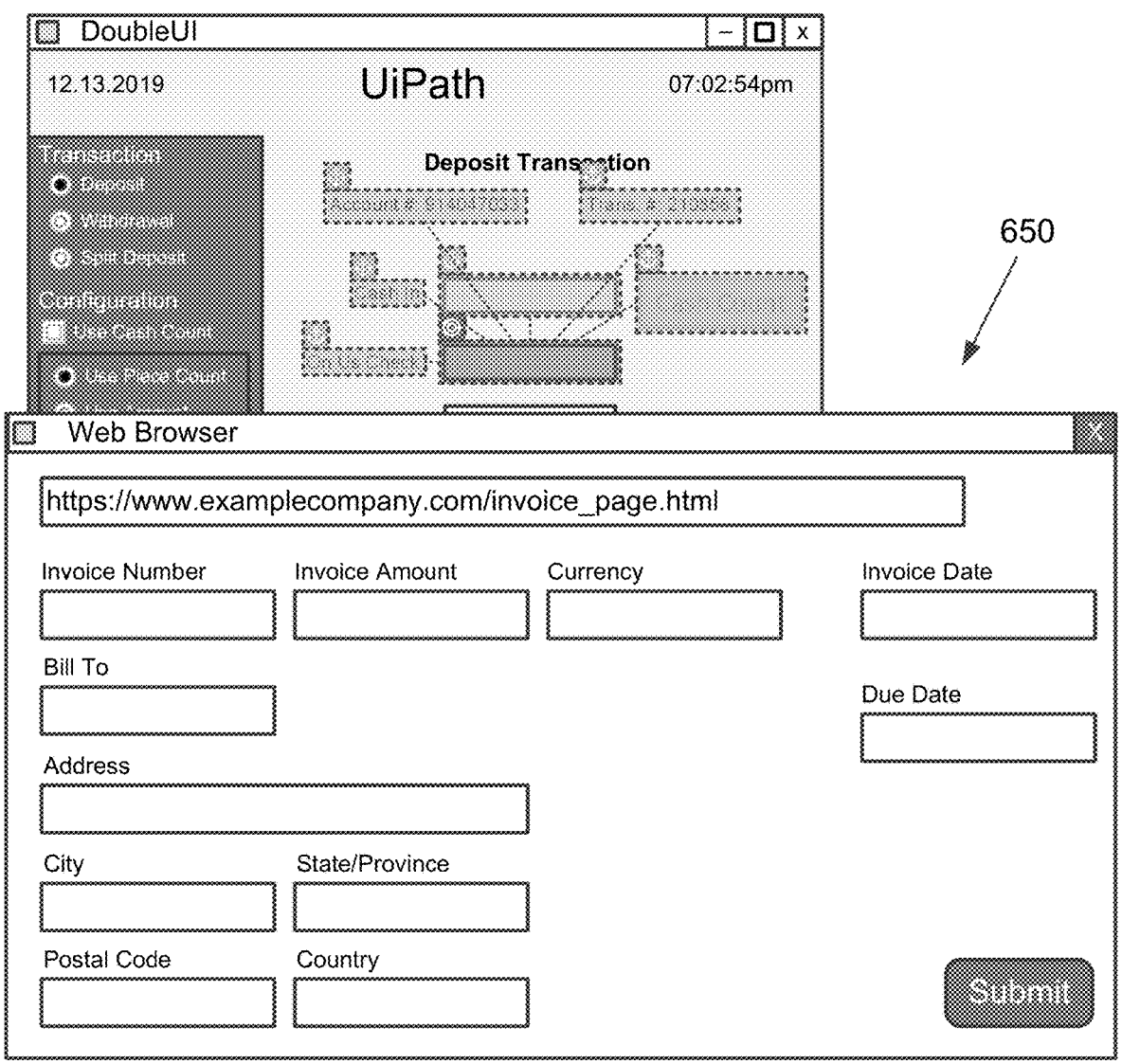
FIG. 6K illustrates the other window partially covering the transaction application window of FIG. 6J where visible anchors within a certain radius of the target are detected, according to an embodiment of the present invention.

In FIGS. 6J and 6K, a web browser window 650 covers approximately the lower half of transaction application window 600. In this case, the additional anchor for the "Not On Us Check" label is hidden and its associated text field is only partially visible, but the remaining anchors are still detected. This scenario could occur at design time or runtime, depending on what the user is doing.

Figure 6L:
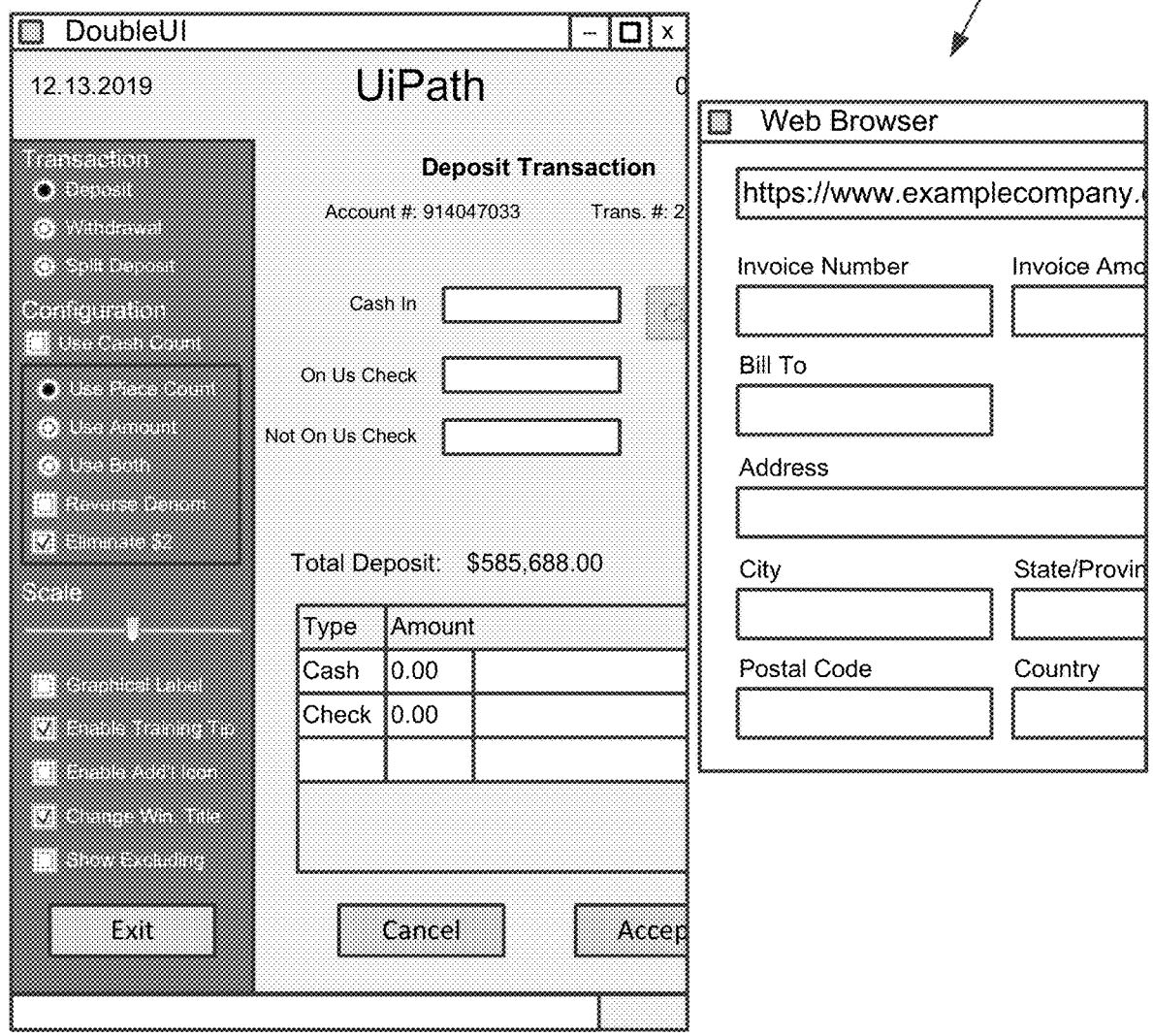
FIG. 6L illustrates the transaction application window where the window is reduced in size horizontally such that part of the window is not shown and another window is adjacent to the window of the transaction application, according to an embodiment of the present invention.
Figure 6M:
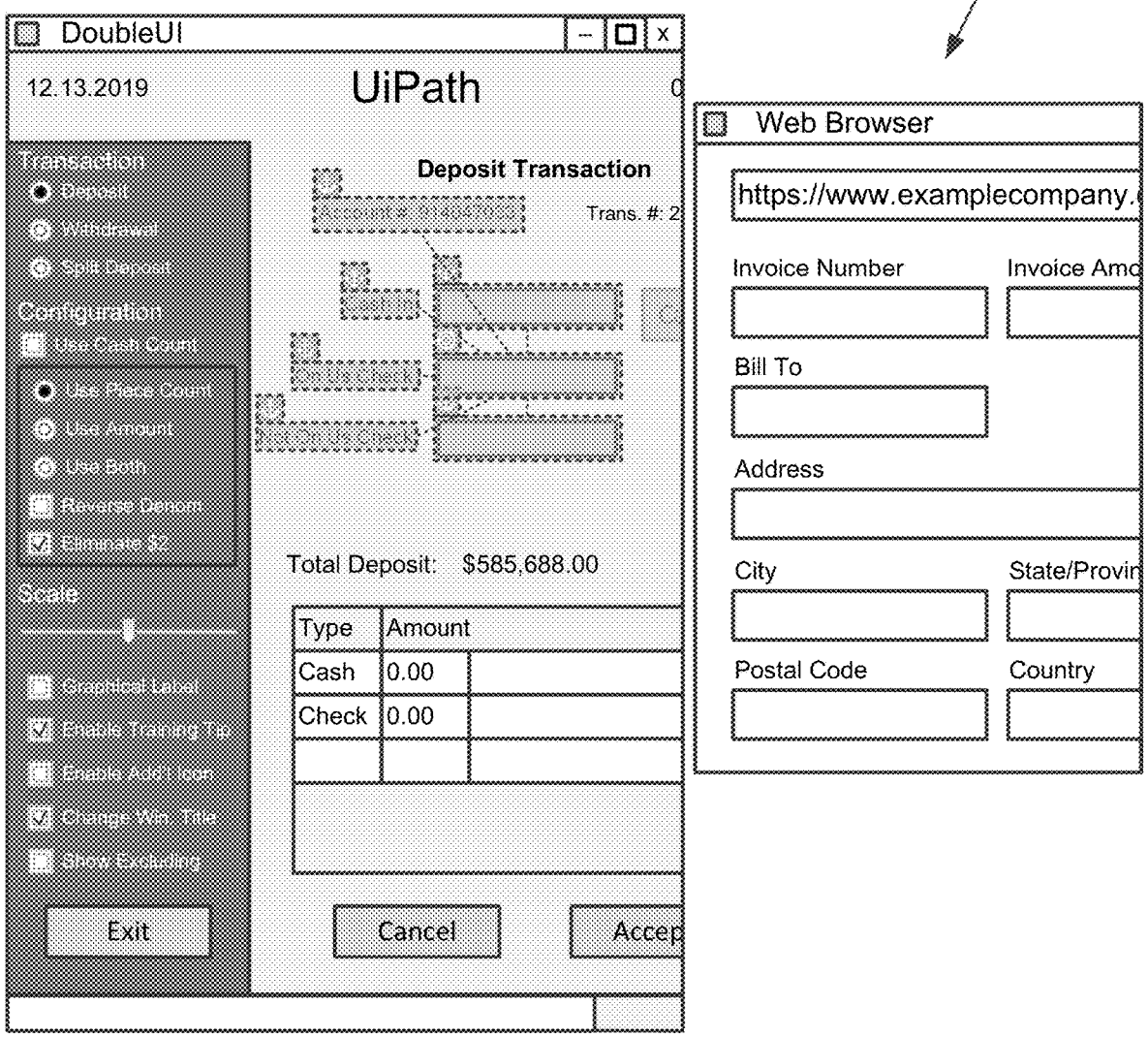
FIG. 6M illustrates a runtime implementation of the scenario of FIG. 6L where visible anchors within a certain radius of the target in the transaction application window are detected, according to an embodiment of the present invention.
Figure 6N:
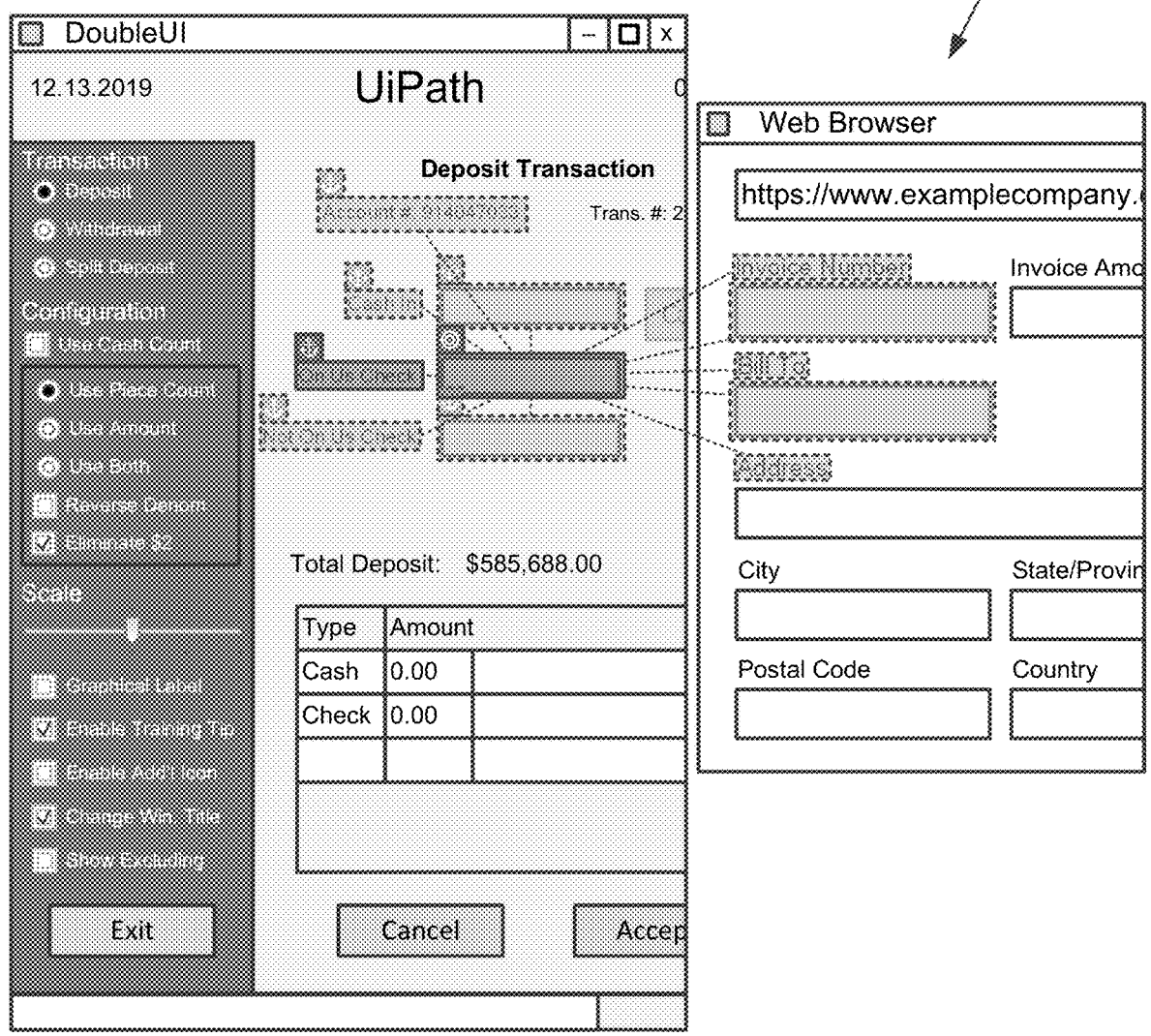
FIG. 6N illustrates a design time implementation of the scenario of FIG. 6L where visible anchors within a certain radius of the target in both the transaction application window and the other window are detected, according to an embodiment of the present invention.

It is also possible that a scenario can arise where another window is adjacent to the application window for the target UI element (e.g., FIGS. 6L-N), or even both overlapping partially covering the application window for the target UI element. In FIG. 6L, part of web browser 650 is visible in this view and located next to transaction application window 600. If the target and anchors were configured at design time as shown in FIGS. 6F and 6G, for example, and the scenario shown in FIG. 6L occurs at runtime, the visible anchors may be detected as shown in FIG. 6M. However, if the scenario is anticipated to occur at design time, the additional anchors within the radius in window 650 may be detected and used in conjunction with anchors for transaction application window 600 for detection of the target UI element, as shown in FIG. 6N. This may be especially useful for cases where it is anticipated that an adjacent window may potentially be proximate to the target UI element at runtime.

In some embodiments, a machine learning (ML) model may be trained to detect windows (for instance, by using labeled screenshot samples with window examples selected). Such a trained ML model may then be used to detect a window associated with the primary anchor (e.g., the "On Us Check" label in FIGS. 6A-N). After this window is detected using the AI/ML model, the additional anchors in that window may be detected.

Some embodiments may attempt to take remedial action(s) if the window of the target appears to be blocked or the target is otherwise not found or available. For instance, if one or more of the anchors are detected with a high confidence (e.g., 95%, 100%, etc.) using CV but the target is not detected, or none of the target/anchors are detected, it may be assumed that the application window is being blocked by another window, a portion thereof is off the screen, or the associated application is not open. The RPA robot may then perform an action or sequence of actions in order to make the entire application window or at least a portion thereof including the target and potentially at least one of the anchors visible including, but not limited to: (1) pressing ALT-TAB and selecting the application to bring the application window that should contain the target to the front; (2) moving the mouse to the location on the screen associated with a detected anchor (or adjacent thereto within some threshold if the anchor UI element performs some action, such as a submit button), pressing ALT-SPACE or CTRL+ALT+SPACE, choosing the "Move" menu option, and moving the window such that it is visible; (3) moving the other window that is blocking the application window that should have the target using such mechanisms; (4) attempting to open the application if it is not already open; (5) performing such functionality using operating system-level API calls; or (6) any combination thereof. Then, the RPA robot may attempt to find the target again using target/anchor techniques such as those described herein. In some embodiments, such actions may be taken preemptively prior to attempting to identify the target UI element.

In certain runtime scenarios, the user may be using a virtual machine where the user terminal is not executing the applications locally. Rather, the user terminal may send information pertaining to key presses, mouse movements, and mouse clicks, for example, and the user terminal may receive a stream of video from a remote server or cloud system that is executing the software applications. In such cases, it may not be known which windows are associated with which applications, or even whether application windows exist. However, if a ML model is used, the ML model may be able to detect this information.

Accordingly, some embodiments may store the image of the initial screen and then bring the next window to the front using ALT-TAB, for example. This screen image may then be analyzed using the target/anchor logic. If the target is not found, the next application window may be brought to the front and the screen may be analyzed this may be repeated a predetermined number of times or until the screen matches the initial screen in some embodiments, at which point the designer application (design time) or robot (runtime) may ask the user for assistance.

In some attended embodiments, the RPA robot may wait for a user to stop interacting with the computing system for an amount of time before attempting to take the remedial action(s). This may prevent the RPA robot from taking control of the computing system in a manner that interferes with what the user is currently attempting to accomplish. For instance, the RPA robot may monitor key presses, mouse clicks, mouse movements, etc., subscribing to Component Object Model (COM) objects, and/or any other suitable mechanism without deviating from the scope of the invention. If the user has not interacted with the computing system for a time period (e.g., 3 seconds, 5 second, 10 seconds, one minute, ten minutes, etc.), the RPA robot may attempt the remedial action(s). In certain embodiments, the RPA robot only operates during one or more time periods where the user is unlikely to be using the computing system (e.g., from midnight to 6:00 am). In some embodiments, the RPA robot may prompt the user regarding whether the remedial action(s) should be taken.

Unlike desktop scenarios, where information may be obtained from the operating system with respect to many applications regarding where windows are located and what they pertain to, in CV for virtual environments, it may be particularly difficult to know what is running. Additional information that may be available in a desktop environment, such as automation IDs, graphical element names, states, etc., may not be readily available in virtual environments. Indeed, in some embodiments, CV for virtual environments may detect the graphical elements on the screen and text, but may not be able to determine which specific applications are running/visible and which graphical elements belong to which application. This limited set of information may lead to reliance on secondary anchors more often since text and graphical elements may appear in various locations on the screen. Also, in desktop scenarios where the IDs are changed or recycled (for instance, in many web browser applications), using secondary anchors may also be beneficial.

In the case where an application is open but minimized on a VM, the application window may be displayed by clicking a task bar icon, or by clicking the caret icon in the lower right of newer versions of Windows®, recognizing the icon, and clicking it. This could be accomplished via an ML model trained at design time. In certain embodiments, the remediation logic may be moved server side (e.g., via RPA robots running on the remote server that is facilitating the VM functionality). A server-side RPA robot could receive information from a client-side RPA robot running on the user's computing system indicating that a target graphical element was not found. The server-side RPA robot could then send information to a client-side RPA robot regarding what is running on the VM and where. VMs may be cloud-based in some embodiments, such as those provided by Citrix® and Remote Desktop Protocol (RDP).

Some embodiments require a mandatory anchor for target detection. If the mandatory anchor is not found, it may be assumed that the target is also missing. The mandatory anchor may prevent false positives. If there are no mandatory anchors, then at runtime, out of the potentially many optional anchors captured at design time, a graphical element on the screen at runtime may look similar to the target graphical element, even if the runtime graphical element is not the correct target graphical element.

Figure 7:
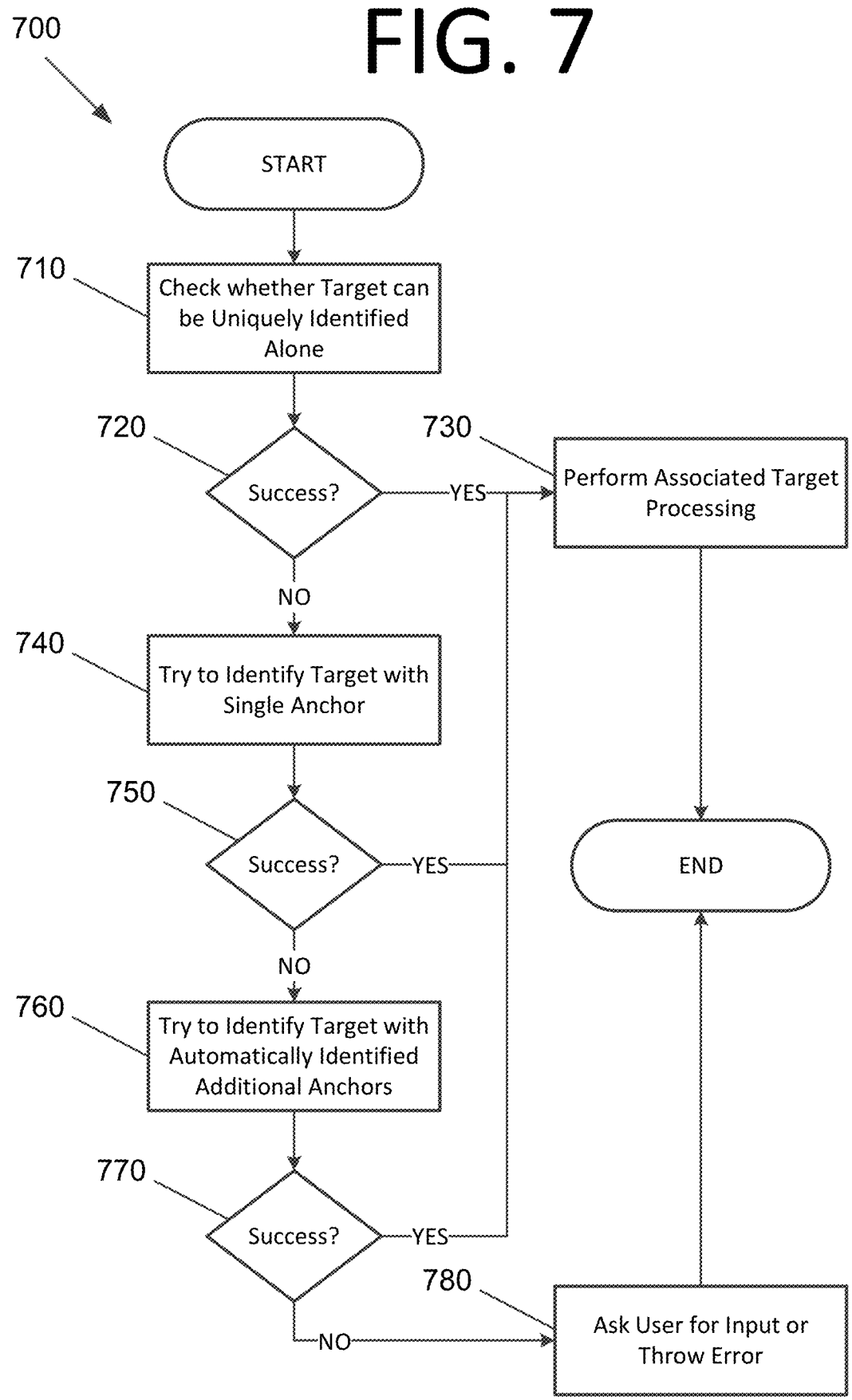
FIG. 7 is a flowchart illustrating a process for performing automatic anchor determination, according to an embodiment of the present invention.

FIG. 7 is a flowchart illustrating a process 700 for performing automatic anchor determination, according to an embodiment of the present invention. The process begins with checking whether a target is distinctive enough alone at 710. This may be accomplished using CV, image matching, graphical element size and/or shape, color(s) within one or more tolerances, and/or any other suitable mechanism without deviating from the scope of the invention. If the target can be uniquely identified with a certain confidence at 720, processing associated with the target is performed at 730 (e.g., configuring an activity of an RPA workflow to use the target information alone for its identification at design time, interacting with the target based on logic of an activity of an RPA workflow at runtime, etc.).

If the target cannot be uniquely identified at 720, however, the geometric relationship between the target and a single anchor (e.g., segment length, segment angle, etc.) may be used at 740. In some embodiments, the single anchor is a user-selected anchor. However, in certain embodiments, the anchor is an automatically selected anchor.

If the target can be uniquely identified using the target/anchor combination at 750, the process proceeds to performing processing associated with the target at 730. However, if the target cannot be uniquely identified at 750, the system automatically identifies one or more additional anchors within a radius of the target and attempts to uniquely identify the target using the geometric relationships between the target and at least two anchors at 760. If the target can be uniquely identified using the combination of the target and at least two anchors at 770, the process proceeds to performing processing associated with the target at 730. However, if the target cannot be found at 770, the user is asked for input or an error is thrown at 780.

Figure 8A:
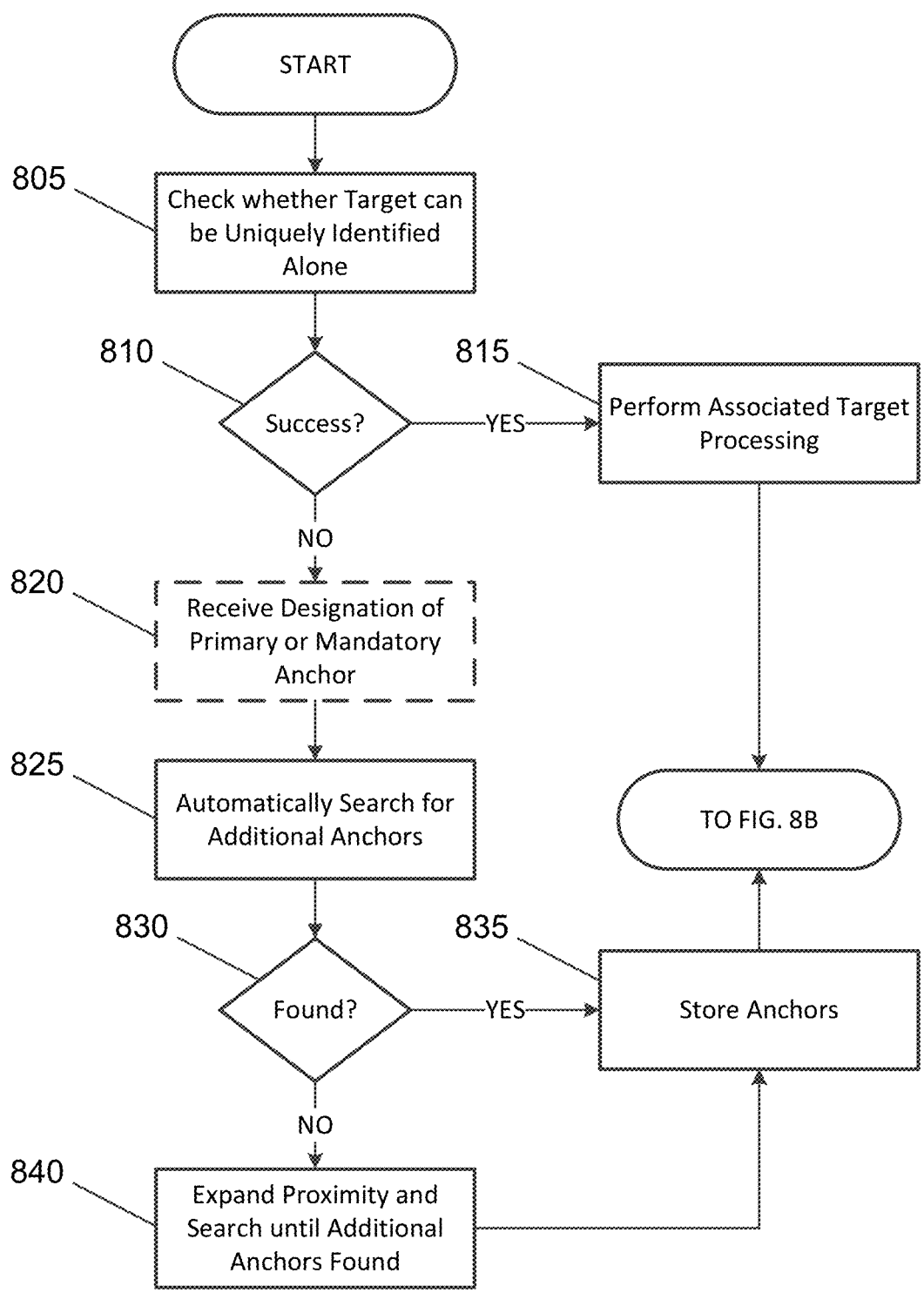
FIGS. 8A and 8B are flowcharts illustrating a process for performing automatic anchor determination and target graphical element identification, according to an embodiment of the present invention.
Figure 8B:
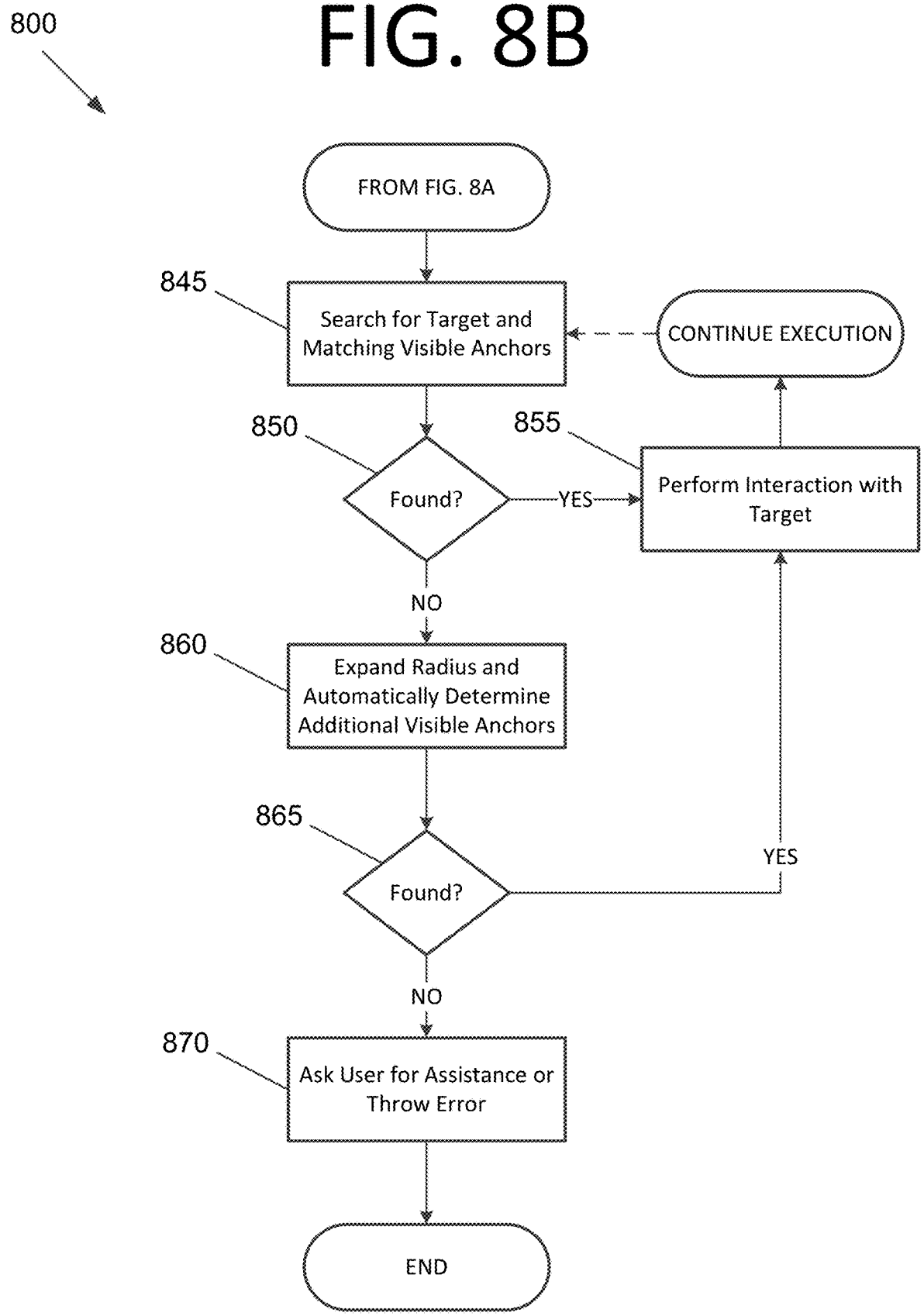

FIGS. 8A and 8B are flowcharts illustrating a process for performing automatic anchor determination and target graphical element identification at design time and at runtime, respectively, according to an embodiment of the present invention. Turning to FIG. 8A, the process begins with checking whether a target graphical element in an image can be identified with at least a confidence at design time at 805. This may be accomplished using CV, image matching, graphical element size and/or shape, color(s) within one or more tolerances, and/or any other suitable mechanism without deviating from the scope of the invention. If the target can be uniquely identified with a certain confidence at 810, processing associated with the target is performed at 815 (e.g., configuring an activity of an RPA workflow to use the target information alone for its identification at design time, interacting with the target based on logic of an activity of an RPA workflow at runtime, etc.).

If the target cannot be uniquely identified with at least the confidence at 810, however, in some embodiments, a designation of a primary anchor or mandatory anchor may be received (and potentially required) or performed automatically at 820. Additional anchors are automatically searched for within a proximity to the target graphical element at 825.

In some embodiments, the proximity is defined by a radius from the target graphical element. If additional anchor(s) are found at 830, the anchors are stored at 835 and the process ends or proceeds to FIG. 8B.

In some embodiments, an ML model may be utilized to detect a window including the designated primary anchor. Matching visible anchors of the automatically determined anchors in the detected window may be identified. These matching visible anchors may then be used at runtime to identify the target graphical element.

In some embodiments, anchor candidates that have more than a predetermined amount of white space or where there is more than a predetermined amount of white space between the target graphical element and the respective anchor candidate are ignored. In certain embodiments, one or more of the automatically determined anchors are located in a different application window than the target graphical element.

If additional anchors are not found at 830, the proximity for the search is expanded at 840. This may be repeated until additional anchors are found, a maximum proximity is reached, or the entire UI has been searched, for example. In anchors are found, the process proceeds to step 835. If no anchors are found, the user may then be prompted for guidance or an error may be thrown.

Turning to FIG. 8B, this considers the case where a target alone was not found to be successful in identifying the target graphical element at runtime, and additional anchors were required. A search is performed for the target graphical element and one or more visible anchors matching the automatically determined anchors that were previously determined for the target graphical element at 845. In some embodiments, geometric relationships between the one or more matching visible anchors and the target graphical element may be used to identify the target graphical element in a UI. In certain embodiments, the identification of the target graphical element is performed at least in part using a combination of CV and a geometric relationship between the target graphical element and at least one of the one or more matching visible anchors. In some embodiments, the geometric relationship includes one or more line segment lengths, one or more angles, or both. In some embodiments, the presence of a primary or mandatory anchor, if included, may be required. In certain embodiments, the one or more visible anchors matching the automatically determined anchors are only searched for when a relationship between the target graphical element and the designated primary or mandatory anchor does not uniquely identify the target graphical element at runtime. In some embodiments, the search for the one or more matching visible anchors is performed within a radius of the target graphical element.

In some embodiments, a subset of the matching visible anchors is used to identify the target graphical element. In certain embodiments, the matching visible anchors are tried one at a time until the target graphical element is identified or all of the matching visible anchors have been tried without successful identification of the target graphical element. In some embodiments, one or more of the one or more matching visible anchors are located in a different application window than the target graphical element. In certain embodiments, an ML model is used to identify matching visible anchors in a window and only those visible anchors are used.

If the target is found at 850, an interaction with the target is performed for the UI automation at 855 and the execution of the UI automation continues. However, when at 850 the one or more matching visible anchors within a radius of the target graphical element do not lead to identification of the target graphical element, or no matching visible anchors are found within the radius, the radius is expanded and one or more matching visible anchors within the expanded radius are automatically determined at 860. This step may be repeated until matching visible anchors are found, a maximum radius is reached, the entire UI has been searched, etc. If the target is found based on the matching visible anchor(s) from the expanded radius (or radii) at 865, the process proceeds to step 855. However, if the target was not found, the user may be asked for assistance or an error is thrown at 870.

Figure 9:
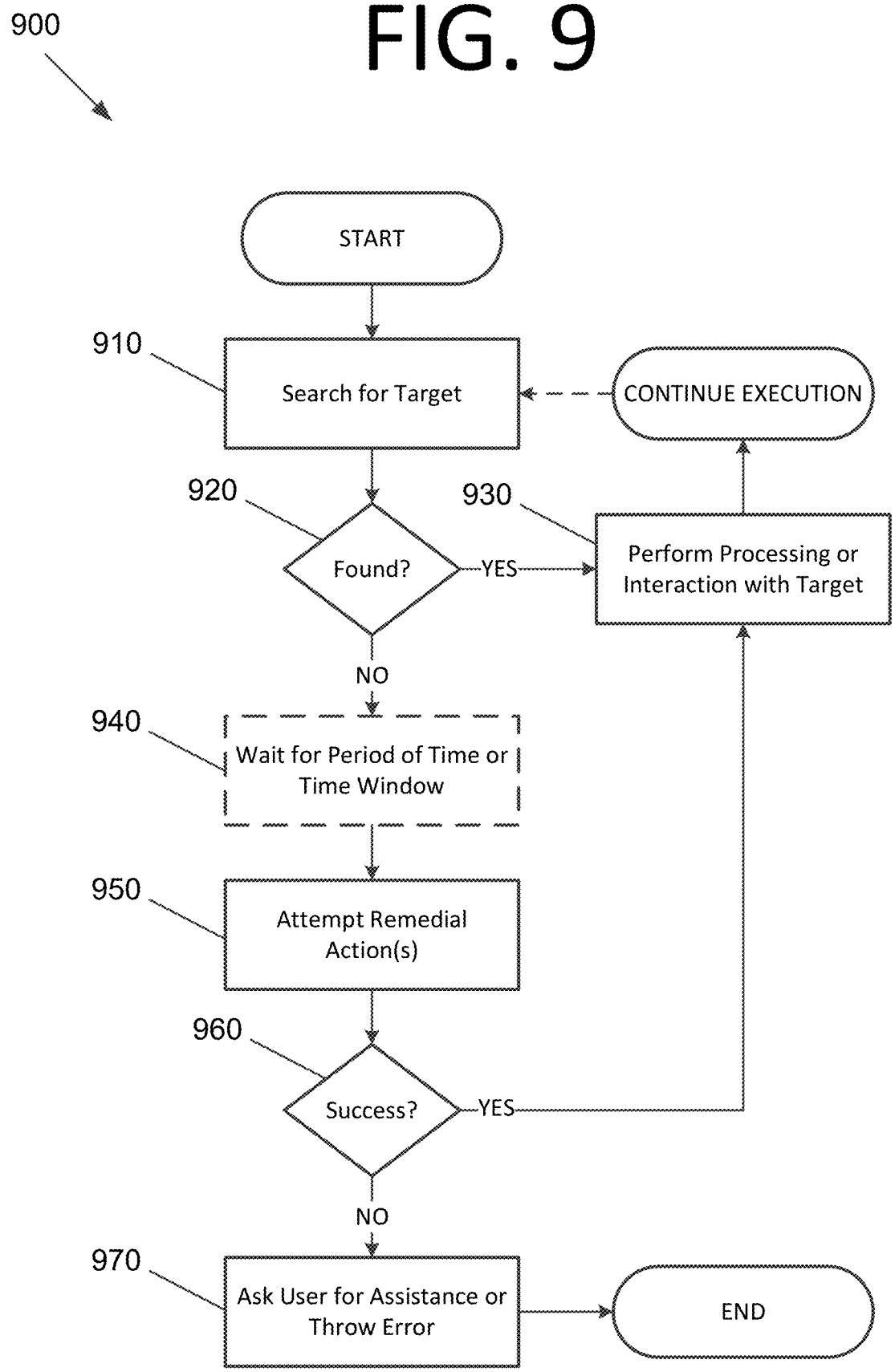
FIG. 9 is a flowchart illustrating a process for attempting remedial action(s) if the window of the target appears to be blocked or the target is otherwise not found or available, according to an embodiment of the present invention.

FIG. 9 is a flowchart illustrating a process 900 for attempting remedial action(s) if the window of the target appears to be blocked or the target is otherwise not found or available, according to an embodiment of the present invention. The process begins with searching for a target graphical element at 910. In some embodiments, the search may be performed in accordance with the associated search steps in FIGS. 7, 8A, or 8B. If the target is found at 920, processing associated with the target graphical element (e.g., configuring an activity of an RPA workflow to use the target information alone for its identification at design time, interacting with the target based on logic of an activity of an RPA workflow at runtime, etc.) or an interaction with the target is performed for a UI automation at 930. In some embodiments, if another target graphical element is to be interacted with in a subsequent step of the UI automation, the process proceeds to step 910 again for that target.

However, if the target is not found at 920, such as if one or more of the anchors are detected with a high confidence (e.g., 95%, 100%, etc.) using CV but the target is not detected, or none of the target/anchors are detected, it may be assumed that the application window is being blocked by another window, a portion thereof is off the screen, or the associated application is not open. In some embodiments, the UI automation (e.g., as performed by an RPA robot) waits for a period of time or waits for a time window when the user is unlikely to be using the computing system at 940. The UI automation then attempts one or more remedial actions at 950. For instance, the UI automation may then perform an action or sequence of actions in order to make the entire application window or at least a portion thereof including the target and potentially at least one of the anchors visible. The action or sequence of actions may include, but are not limited to: (1) pressing ALT-TAB (e.g., simulating the presses of these keys) and selecting the application to bring the application window that should contain the target to the front of the UI; (2) moving the mouse pointer to the location on the screen associated with a detected anchor (or adjacent thereto within some threshold if the anchor UI element performs some action, such as a submit button), pressing ALT-SPACE or CTRL+ALT+SPACE, choosing the "Move" menu option, and moving the window such that it is visible; (3) moving the other window (or windows) that is/are blocking the application window that should have the target using such mechanisms; (4) attempting to open the application if it is not already open; (5) performing such functionality using operating system-level API calls; or (6) any combination thereof.

In some virtual embodiments, the RPA robot may not be able to determine application and window information locally. In such embodiments, the RPA robot may receive information from a server running the VM pertaining to applications that are running, windows that are open, and locations of the open windows. The RPA robot may then use the received information to generate mouse click information, key press information, or both, that cause the server to move a window associated with the target graphical element into a foreground of the UI, launch an application associated with the target graphical element, or both. In this manner, similar operations to those described above may be performed in a VM environment.

If the target is successfully found at 960, the process proceeds to step 930. However, if the target is not successfully found after taking the remedial action(s), the user may be asked for assistance or an error is thrown at 970. It should be noted that in some embodiments, steps 940 and/or 950 may be performed before step 910 in an attempt to preemptively make the target UI element and potentially one or more anchors visible.

In some embodiments, step 970 may involve obtaining an indication of the target graphical element or recording remedial actions taken by a user. For instance, in some embodiments, a bounding box or an indication identifying the undetected target graphical element in the UI may be received, a UI descriptor for the target graphical element associated with the bounding box or the indication may be determined, and logic associated with the UI automation may be updated or an ML model may be retrained to use the determined UI descriptor. In certain embodiments, a recorder may be started that observes remedial user interactions with the computing system, the remedial user interactions may be recorded, and the recorded remedial user interactions may be used to update logic associated with the UI automation or to retrain an ML model to find the target graphical element.

Figure 10A:
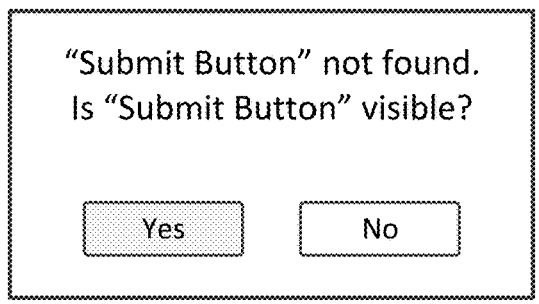
FIGS. 10A-C illustrate a popup asking a user for confirmation and assistance, according to an embodiment of the present invention.
Figure 10B:
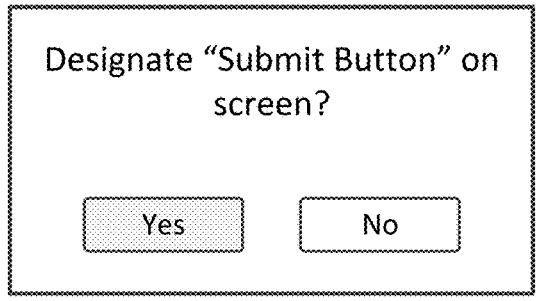

Per the above, cases may occur where a graphical element is not on the screen at all or is there, but was not detected (e.g., due to a change in a selector that is dynamic and no longer matches what the robot expects). In such instances, a popup, such as popup 1000 of FIG. 10A, may be displayed asking the user whether the target graphical element is visible on the screen. If so, the popup may ask the user whether he or she would like to designate the target graphical element. See, for example, FIG. 10B. The user may then designate the target graphical element on the screen. For instance, in shopping cart shipping information window 1010 of FIG. 10D, the user may draw a bounding box 1012 around the target graphical element. Alternatively, the user may click on the location of the target graphical element and the RPA robot may figure out what graphical element is located at that location. The robot can then use this information to find the graphical element in the future. For example, the RPA robot could compare its selector information for the graphical element to the selector of the element that the user indicated. The robot could then use this selector information in the future. In certain embodiments, this information may be used for retraining a local or global ML model. Such features enabled on many user machines could lead to a more robust global ML model.

Figure 10C:
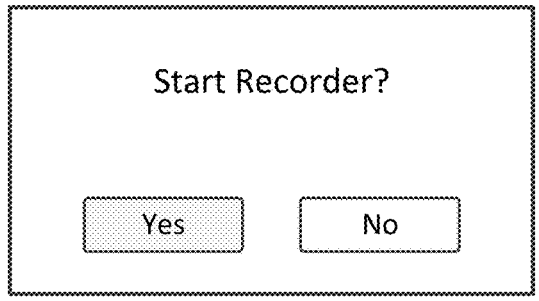

In some embodiments, when the target graphical element is not on the screen at all, the user may be able to initiate a recorder that watches the user's remediation steps. For instance, if the user clicks the "No" button in FIG. 10A, popup 1000 may ask the user whether to start the recorder, as shown in FIG. 10C. A recorder application may then run in the background or recorder logic may be run by the RPA robot. The recorder application or RPA robot may then record each action taken by the user, such as the user clicking a back button to return to a previous webpage that includes the target graphical element and clicking on it. This recorded information (e.g., mouse clicks and locations, key presses, the order of each action, etc.) may be used to teach the RPA robot how to reproduce the remedial action taken by the user or to train an ML model to perform the remedial action.

In some embodiments, RPA robots implementing recorder functionality may send the recorded remedial information (e.g., as an XAML file) to be used by an RPA developer in an RPA designer application. The RPA developer can then modify the workflow of the RPA robot to correct its logic. In certain embodiments, the recorded remedial information may be incorporated into the workflow of the RPA robot without action by an RPA developer.

The process steps performed in FIGS. 7-9 may be performed by a computer program, encoding instructions for the processor(s) to perform at least part of the process(es) described in FIGS. 7-9 in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 7-9, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computing system, comprising:
memory storing computer program instructions for performing target graphical element detection in a user interface (UI) automation; and
at least one processor configured to execute the computer program instructions, wherein the computer program instructions are configured to cause the at least one processor to:
search for a target graphical element and one or more visible anchors matching anchors associated with the target graphical element,
when the target graphical element is found in the search, use geometric relationships between the one or more matching visible anchors and the target graphical element to identify the target graphical element in a UI, and
when the target graphical element is not found in the search, attempt a remedial action to make the target graphical element visible, wherein
the remedial action comprises moving a mouse pointer to a location in the UI associated with a detected anchor or a location adjacent to the detected anchor, simultaneously simulating presses of ALT and SPACE keys or CTRL and ALT and SPACE keys, choosing a "Move" menu option, and moving an application window associated with the target graphical element to be more visible or entirely visible.

2. The computing system of claim 1, wherein the remedial action comprises simultaneously simulating presses of ALT and TAB keys and selecting an application window associated with the target graphical element to bring the application window to a front of the UI.

3. The computing system of claim 1, wherein the remedial action comprises moving one or more other windows that are blocking an application window associated with the target graphical element.

4. The computing system of claim 1, wherein the remedial action comprises attempting to open an application associated with the target graphical element when the application is not already open.

5. The computing system of claim 1, wherein the remedial action comprises using operating system-level application programming interface (API) calls to make an application window associated with the target graphical element visible or to open an application associated with the target graphical element when the application is not already open.

6. The computing system of claim 1, wherein the computer program instructions are configured to cause the at least one processor to:
wait for a period of time during which a user has not interacted with the computing system before attempting the remedial action.

7. The computing system of claim 1, wherein the computer program instructions are configured to cause the at least one processor to:
wait for a time when a user is unlikely to interact with the computing system before attempting the remedial action.

8. The computing system of claim 1, wherein the UI automation is executed in a virtual machine (VM) environment and the remedial action comprises:
clicking a task bar icon for an application associated with the target graphical element to launch the application.

9. The computing system of claim 1, wherein the UI automation is executed in a virtual machine (VM) environment and the remedial action comprises:
receiving information from a server running the VM pertaining to applications that are running, windows that are open, and locations of the open windows; and
using the received information to generate mouse click information, key press information, or both, that cause the server to move a window associated with the target graphical element into a foreground of the UI, launch an application associated with the target graphical element, or both.

10. The computing system of claim 1, wherein when the remedial action is not successful in allowing the UI automation to find the target graphical element, the computer program instructions are configured to cause the at least one processor to:
receive a bounding box or an indication identifying the undetected target graphical element in the UI;
determine a UI descriptor for the target graphical element associated with the bounding box or the indication; and
update logic associated with the UI automation or retrain a machine learning (ML) model to use the determined UI descriptor.

11. The computing system of claim 1, wherein when the remedial action is not successful in allowing the UI automation to find the target graphical element, the computer program instructions are configured to cause the at least one processor to:
start a recorder that observes remedial user interactions with the computing system;
record the remedial user interactions; and
use the recorded remedial user interactions to update logic associated with the UI automation or retrain a machine learning (ML) model to find the target graphical element.

12. The computing system of claim 11, wherein the UI automation is performed by a robotic process automation (RPA) robot.

13. A computer-implemented method for performing target graphical element identification in a user interface (UI) automation, comprising:
searching, by a robotic process automation (RPA) robot, for a target graphical element and one or more visible anchors matching anchors associated with the target graphical element; and
when the target graphical element is not found in the search, attempting a remedial action to make the target graphical element visible, by the RPA robot, wherein when the remedial action is not successful in allowing the RPA robot to find the target graphical element, the method further comprises:
receiving a bounding box or an indication identifying the undetected target graphical element in the UI, by the RPA robot;
determining a UI descriptor for the target graphical element associated with the bounding box or the indication, by the RPA robot; and
updating logic associated with the UI automation or retraining a machine learning (ML) model to use the determined UI descriptor.

14. The computer-implemented method of claim 13, wherein the remedial action comprises:
simultaneously simulating presses of ALT and TAB keys and selecting an application window associated with the target graphical element to bring the application window to a front of the UI;
moving a mouse pointer to a location in the UI associated with a detected anchor or a location adjacent to the detected anchor, simultaneously simulating presses of ALT and SPACE keys or CTRL and ALT and SPACE keys, choosing a "Move" menu option, and moving the application window associated with the target graphical element to be more visible or entirely visible;
moving one or more other windows that are blocking the application window associated with the target graphical element;
attempting to open an application associated with the target graphical element when the application is not already open;
using operating system-level application programming interface (API) calls to make the application window associated with the target graphical element visible or to open the application associated with the target graphical element when the application is not already open; or
a combination thereof.

15. The computer-implemented method of claim 13, further comprising:
waiting for a period of time during which a user has not interacted with a computing system before attempting the remedial action, by the RPA robot.

16. The computer-implemented method of claim 13, wherein the UI automation is executed in a virtual machine (VM) environment and the remedial action comprises:
clicking a task bar icon for an application associated with the target graphical element to launch the application.

17. The computer-implemented method of claim 13, wherein the UI automation is executed in a virtual machine (VM) environment and the remedial action comprises:
receiving information from a server running the VM pertaining to applications that are running, windows that are open, and locations of the open windows; and
using the received information to generate mouse click information, key press information, or both, that cause the server to move a window associated with the target graphical element into a foreground of the UI, launch an application associated with the target graphical element, or both.

18. The computer-implemented method of claim 13, wherein when the remedial action is not successful in allowing the RPA robot to find the target graphical element, the method further comprises:

starting a recorder that observes remedial user interactions with a computing system, by the RPA robot;

recording the remedial user interactions, by the RPA robot; and using the recorded remedial user interactions to update logic associated with the UI automation or retrain the ML model to find the target graphical element.

19. A non-transitory computer-readable medium storing a computer program for performing target graphical element detection in a user interface (UI) automation, the computer program configured to cause at least one processor to:

search for a target graphical element and one or more visible anchors matching anchors associated with the target graphical element; and when the target graphical element is not found in the search:

receive information from a server running a virtual machine (VM) pertaining to applications that are running, windows that are open, and locations of the open windows, and attempt a remedial action by using the received information to generate mouse click information, key press information, or both, that cause the server to move a window associated with the target graphical element into a foreground of the UI, launch an application associated with the target graphical element, or both, wherein when the remedial action is not successful in allowing the UI automation to find the target graphical element, the computer program is further configured to cause the at least one processor to:

start a recorder that observes remedial user interactions with a computing system, record the remedial user interactions, and use the recorded remedial user interactions to update logic associated with the UI automation or retrain a machine learning (ML) model to find the target graphical element.

20. The non-transitory computer-readable medium of claim 19, wherein when the remedial action is not successful in allowing the UI automation to find the target graphical element, the computer program is further configured to cause the at least one processor to:

receive a bounding box or an indication identifying the undetected target graphical element in the UI;

determine a UI descriptor for the target graphical element associated with the bounding box or the indication; and update logic associated with the UI automation or retraining the ML model to use the determined UI descriptor.

* * * * *